(12) United States Patent
Aoki et al.

(10) Patent No.: US 8,386,634 B2
(45) Date of Patent: Feb. 26, 2013

(54) COMMUNICATION SYSTEM WITH REMOVABLE OPERATION MEMBER PROVIDING INTERNET ACCESS

(75) Inventors: Kazuma Aoki, Kasugai (JP); Yoshiyuki Kondo, Okazaki (JP); Yuji Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1226 days.

(21) Appl. No.: 10/771,412

(22) Filed: Feb. 5, 2004

(65) Prior Publication Data

US 2004/0205226 A1 Oct. 14, 2004

(30) Foreign Application Priority Data

Feb. 5, 2003 (JP) ................................. 2003-028361

(51) Int. Cl.
*G06F 15/16* (2006.01)
(52) U.S. Cl. ........................................................ 709/232
(58) Field of Classification Search .................... 709/232
See application file for complete search history.

(56) References Cited

U.S. PATENT DOCUMENTS

| | | | | |
|---|---|---|---|---|
| 5,477,264 A * | 12/1995 | Sarbadhikari et al. | ..... | 348/231.6 |
| 5,597,307 A * | 1/1997 | Redford et al. | ............... | 434/118 |
| 5,901,286 A * | 5/1999 | Danknick et al. | ............. | 709/203 |
| 6,003,087 A * | 12/1999 | Housel et al. | ................... | 709/229 |
| 6,012,083 A * | 1/2000 | Savitzky et al. | ............... | 709/202 |
| 6,134,017 A * | 10/2000 | Schlank et al. | ............... | 358/1.15 |
| 6,230,189 B1 * | 5/2001 | Sato et al. | ...................... | 709/206 |
| 6,289,371 B1 * | 9/2001 | Kumpf et al. | .................. | 709/203 |
| 6,363,421 B2 * | 3/2002 | Barker et al. | .................. | 709/223 |
| 6,396,848 B1 * | 5/2002 | Ohta | .............................. | 370/490 |
| 6,438,574 B1 * | 8/2002 | Nagashima | ..................... | 718/102 |
| 6,453,078 B2 * | 9/2002 | Bubie et al. | .................... | 382/305 |
| 6,505,252 B1 * | 1/2003 | Nagasaka | ...................... | 709/232 |
| 6,535,921 B2 * | 3/2003 | Hirasawa et al. | .............. | 709/232 |
| 6,553,431 B1 * | 4/2003 | Yamamoto et al. | ................ | 710/8 |
| 6,633,984 B2 * | 10/2003 | Susser et al. | ..................... | 726/21 |
| 6,725,300 B1 * | 4/2004 | Nagasaka et al. | ............... | 710/62 |
| 6,747,754 B1 * | 6/2004 | Iyoki | ............................ | 358/1.15 |
| 6,850,986 B1 * | 2/2005 | Peacock | ........................ | 709/232 |
| 6,976,084 B2 * | 12/2005 | Pineau et al. | .................. | 709/232 |
| 7,024,475 B1 * | 4/2006 | Abaye et al. | ................... | 709/224 |
| 7,515,290 B2 * | 4/2009 | Negishi et al. | ............... | 358/1.15 |

(Continued)

FOREIGN PATENT DOCUMENTS

| | | | |
|---|---|---|---|
| JP | A 11-165911 | 6/1999 | |
| JP | A 11-282441 | 10/1999 | |

(Continued)

*Primary Examiner* — Krista Zele
*Assistant Examiner* — Tariq Najee-Ullah
(74) *Attorney, Agent, or Firm* — Oliff & Berridge, PLC

(57) ABSTRACT

A communication system includes a communication device provided with an accessing system capable of accessing web pages. At least one operation member which is operable with being attached to the communication system is provided. The operation member has a data storage containing first access data which is used by the communication device to access a first predetermined web page. The system includes a transmitting system that transmits the first access data contained in the data storage to the accessing system when the at least one operation member is operated while it is attached to the communication device. In this configuration, the accessing system accesses the first predetermined web page based on the first access data transmitted from the data storage of the at least one operation member.

26 Claims, 12 Drawing Sheets

U.S. PATENT DOCUMENTS

| | | | |
|---|---|---|---|
| 7,668,940 B2 * | 2/2010 | Matsukura | 709/220 |
| 7,908,401 B2 * | 3/2011 | Chang | 709/250 |
| 8,169,635 B2 * | 5/2012 | Kondo et al. | 358/1.15 |
| 2001/0018737 A1 * | 8/2001 | Redford et al. | 713/2 |
| 2002/0018130 A1 | 2/2002 | Suemoto et al. | |
| 2002/0054279 A1 * | 5/2002 | Hoshino et al. | 355/40 |
| 2002/0075524 A1 * | 6/2002 | Blair et al. | 358/442 |
| 2002/0156923 A1 * | 10/2002 | Tanimoto | 709/246 |
| 2003/0007188 A1 * | 1/2003 | Hoshino et al. | 358/401 |
| 2003/0014533 A1 * | 1/2003 | Greene et al. | 709/232 |
| 2003/0020945 A1 * | 1/2003 | Lopez et al. | 358/1.15 |
| 2003/0028382 A1 * | 2/2003 | Chambers et al. | 704/275 |
| 2003/0038971 A1 * | 2/2003 | Renda | 358/1.16 |
| 2003/0182438 A1 * | 9/2003 | Tenenbaum | 709/232 |
| 2004/0068576 A1 * | 4/2004 | Lindbo et al. | 709/232 |
| 2004/0088378 A1 * | 5/2004 | Moats | 709/219 |
| 2005/0068547 A1 * | 3/2005 | Negishi et al. | 358/1.1 |
| 2005/0099650 A1 * | 5/2005 | Brown et al. | 358/1.15 |
| 2009/0006747 A1 * | 1/2009 | Otsuka | 711/115 |

FOREIGN PATENT DOCUMENTS

| | | | |
|---|---|---|---|
| JP | A 2001-268508 | | 9/2001 |
| JP | A 2002-091856 | * | 3/2002 |
| JP | A 2002-108737 | | 4/2002 |

* cited by examiner

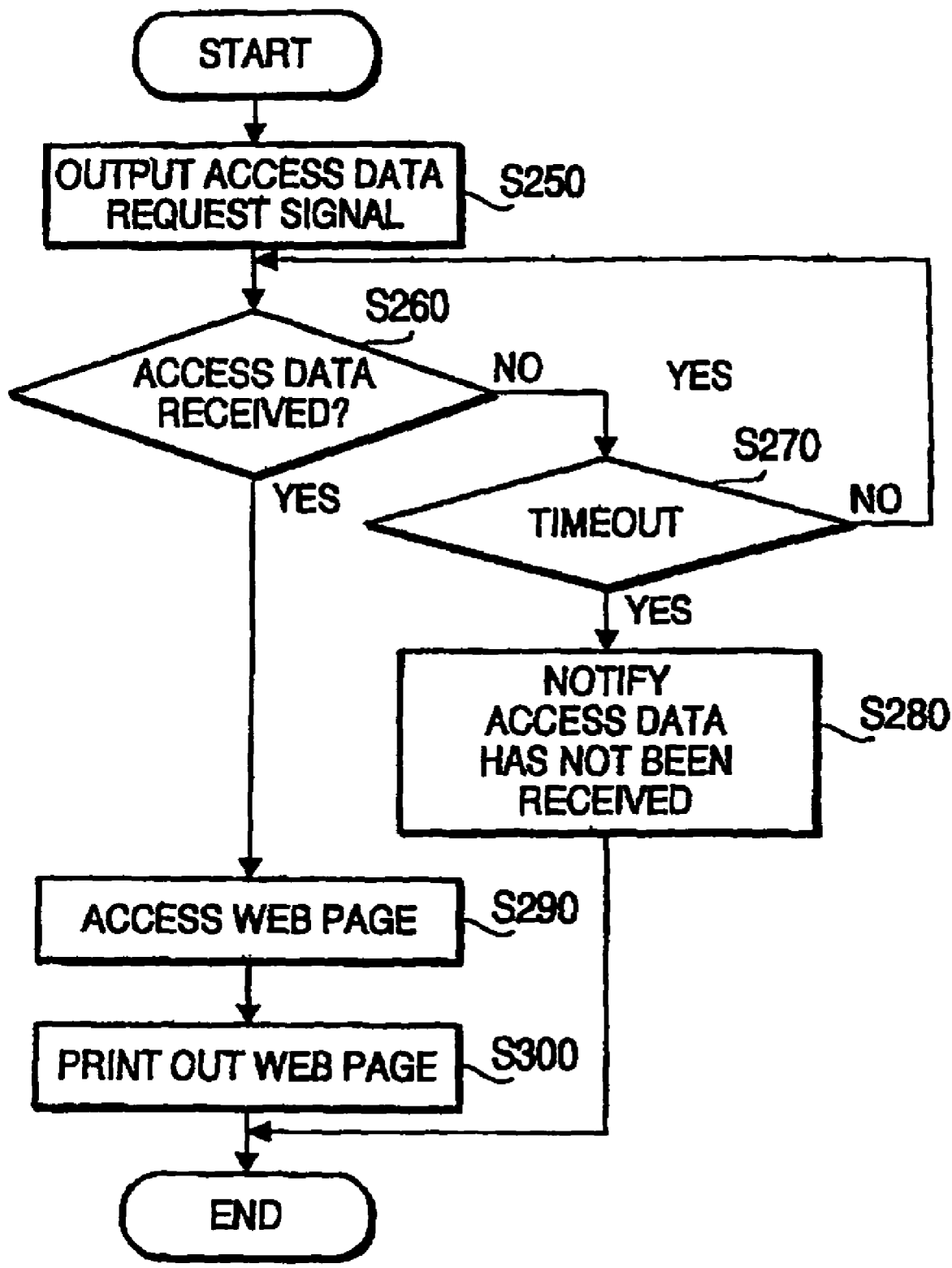

COMMUNICATION SYSTEM WITH REMOVABLE OPERATION MEMBER PROVIDING INTERNET ACCESS

BACKGROUND OF THE INVENTION

The present invention relates to a communication system which enabling an access to a web page without inputting a character string indicating the web page, and an operation member, terminal device and program product therefor.

A communication system for accessing a web page through a network such as the Internet has been well known.

Generally, when a user accesses a web page using a communication device, the user is required to input access data, which is typically a URL (Uniform Resource Locator) using a keyboard of the communication device. Since the URL is a relatively long character string, to input the URL correctly is troublesome.

Recently, various devices (e.g., telephones, cell phones, facsimile machines) are configured to access web pages, and some of the devices are not provided with an appropriate system for inputting the URL (i.e., character strings). In such devices, it is very troublesome to enter the character string indicating the desired web page.

In order to deal with the above problem, various techniques for accessing web pages without inputting the character string have been suggested recently.

For example, when a removable recording medium (e.g., a memory card) can be attached to a communication device, the access data for accessing a predetermined web page is stored in the recording medium. When the recording medium is attached to the communication device, the communication device automatically retrieves the access data and accesses the web page. An example of such a communication device is disclosed in Japanese Patent Provisional Publication P2002-108737A. Such a configuration is advantageous in that one web page corresponds to one web page, and the user can browse a desired web page when an appropriate recording medium is used.

However, according to the above-described configuration, every time when the user intends to access the web page, the recording medium should be removed once, and then re-inserted in the device, which is troublesome. Further, when the user intends to browse another web page, another recording medium is used. In such a system, the unused recording medium may be lost, or wrong recording medium may be used by error.

SUMMARY OF THE INVENTION

The present invention is advantageous in that an improved communication system is provided in which a user can access a web page without inputting a character string, and can easily browse the web page repeatedly with a simple operation.

According to an aspect of the invention, there is provided a communication system, which includes a communication device provided with an accessing system capable of accessing web pages, at least one operation member attachable to the communication device, the at least one operation member being operable with being attached to the communication system, the at least one operation member being provided with a data storage containing first access data which is used by the communication device to access a first predetermined web page, and a transmitting system that transmits the first access data contained in the data storage to the accessing system when the at least one operation member is operated while it is attached to the communication device. In this configuration, the accessing system accesses the first predetermined web page based on the first access data transmitted from the data storage of the at least one operation member.

Optionally, the transmitting system may be included in the at least one operation member. The transmitting system may determine whether a predetermined condition is satisfied when the at least one operation member is operated with being attached to the communication system, the transmitting system transmitting the first access data contained in the data storage to the accessing system when the predetermined condition is satisfied.

Further optionally, the at least one operation member may include a operation detection system that detects operation of the at least one operation member, and a counting system that counts the number of times by which the first access data contained in the data storage is transmitted to the accessing system by the transmitting system. In this case, the transmitting system may determine that the predetermined condition is satisfied if the number of times counted by the counting system is less than a predetermined number when the operation detection system detects the operation of the at least one operation member, the transmitting system determining the predetermined condition is not satisfied if the number of times counted by the counting system has reached the predetermined number.

Further, the communication device may include a count inquiry system that transmits a count inquiry signal inquiring the number counted by the counting system to the at least one operation member, and a count notifying system that notifies the number counted by the counting system based on a count response signal which is transmitted by the at least one operation member in response to the count inquiry signal transmitted thereto. Further, the operation member may include a count response system that output the count response signal to the communication device in response to the count inquiry signal transmitted from the communication device.

In this case, the count inquiry system may transmit the count inquiry signal when the first access data is transmitted from the at least one operation member.

Optionally, the communication device may include an attachment detection system that detects attachment of the operation member to the communication device, the count inquiry system outputting the count inquiry signal when the attachment detection system detects attachment of the operation member.

Alternatively, the communication device may include an allowed number inquiry system that transmits an allowed number inquiring signal inquiring the allowed number of times by which the readout of the first access data stored in the data storage is allowed to be read to the at least one operation member, and an allowed number notifying system that notifies the allowed number based on a response signal which is transmitted by the at least one operation member in response to the allowance number inquiry signal transmitted thereto. Further, the operation member may include a response system that outputs the response signal to the communication device in response to the allowed number inquiry signal transmitted from the communication device.

In this case, the allowed number inquiry system may transmit the allowed number inquiry signal when the first access data is transmitted from the at least one operation member.

Further, the communication device may include an attachment detection system that detects attachment of the operation member to the communication device, the allowed number inquiry system outputting the allowed number inquiry signal when the attachment detection system detects attachment of the operation member.

Optionally, the data storage contains second access data indicating a second web page as well as the first access data, and the transmitting system may be configured to transmit the second access data stored in the data storage to the accessing system if the predetermined condition is not satisfied when the operation member is operated with being attached to the communication device.

Further optionally, the communication device may include a device side detecting system that detects that the at least one operation member is operated with being attached to the communication device, and a notification system that notifies that the first access data is not received since the predetermined condition is not satisfied if the fist access data is not transmitted from the at least one operation member for a predetermined period.

Alternatively, the transmitting system may be included in the communication device. The transmitting system determines whether a predetermined condition is satisfied when the at least one operation member is operated with being attached to the communication system, the transmitting system transmitting the first access data contained in the data storage to the accessing system when the predetermined condition is satisfied.

Optionally, the data storage may store the readout number of times by which the first access data is transmitted by the transmitting system as well as the first access data, and the communication device may include a device side detection system that detects that the at least one operation member is operated, a readout system that reads the readout number of times from the data storage when the device side detection system detects that the at least one operation member is operated. In this case, the transmitting system may determine that the predetermined condition is satisfied if the readout number has not reached a predetermined number, the transmitting system determining that the predetermined condition is not satisfied when the readout number has reached the predetermined number, and the communication device may further include a rewriting system that rewrites the readout number stored in the data storage of the at least one operation member with the readout number incremented by one when the first access data is read out by the transmitting system.

Still optionally, the communication device may include a notification system that notifies the readout number read out by the readout system.

Further optionally, the data storage contains an allowed number of times by which the first access data is allowed to be read out. The readout system may read out the readout number and the allowed number from the data storage when the device side detection system detects the operation of the at least one operation member, and the transmitting system may determine that the predetermined condition is satisfied if the readout number has not reached the allowed number, the transmitting system determining that the predetermined condition is not satisfied when the readout number has reached the allowed number.

Furthermore, the data storage may contain second access data indicating a second web page as well as the first access data, and the transmitting system may transmit the second access data stored in the data storage to the accessing system if the predetermined condition is not satisfied when the operation member is operated with being attached to the communication device.

According to another aspect of the invention, there is provided a communication system, which is provided with a communication device provided with an accessing system capable of accessing web pages, a plurality of operation members attachable to the communication device, each of the plurality of operation members being operable with being attached to the communication system, each of the plurality of operation members being provided with a data storage containing first access data which is used by the communication device to access a first predetermined web page, an operation detection system that identifies an operated one of the plurality of operation member, and a transmitting system that transmits the first access data contained in the data storage of the operated one of the plurality of operation member to the accessing system, the accessing system accessing the first predetermined web page based on the first access data transmitted by the transmitting system.

According to another aspect of the invention, there is provided an operation member for a communication system including a communication device capable of accessing web pages, the operation member being attachable to the communication device, the operation member being operable with being attached to the communication system, the operation member being provided with a data storage containing first access data which is used by the communication device to access a first predetermined web page, when the operation member is operated with being attached to the communication device, the first access data contained in the data storage is transmitted to the communication device, which accesses the first predetermined web page based on the first access data transmitted from the data storage of the operation member.

Optionally, an indication related to the first web page being formed on a surface of the operation member.

Further, the operation member may be provided with a transmitting system that transmits the first access data to the communication device, the transmitting system determining whether a predetermined condition is satisfied when the operation member is operated with being attached to the communication system, the transmitting system transmitting the first access data contained in the data storage to the communication device when the predetermined condition is satisfied.

Alternatively, the communication device may include a transmitting system which determines whether a predetermined condition is satisfied when the operation member is operated with being attached to the communication system, the transmitting system transmitting the first access data contained in the data storage to the communication device when the predetermined condition is satisfied.

According to a further aspect of the invention, there is provided a computer program product defining a procedure to be executed by a computer employed in a communication system, the communication system including a communication device provided with an accessing system capable of accessing web pages, at least one operation member attachable to the communication device, the at least one operation member being operable with being attached to the communication system, the at least one operation member being provided with a data storage containing first access data which is used by the communication device to access a first predetermined web page, and a transmitting system that transmits the first access data contained in the data storage to the accessing system when the at least one operation member is operated while it is attached to the communication device, the accessing system accessing the first predetermined web page based on the first access data transmitted from the data storage of the at least one operation member, the computer that executes the procedure defined by the computer program product functioning as the communication device.

Optionally, the transmitting system may be included in the communication device, the computer that executes the procedure defined by the computer program product functioning as the transmitting system, the transmitting system determining whether a predetermined condition is satisfied when the at least one operation member is operated with being attached to the communication system, the transmitting system transmitting the first access data contained in the data storage to the accessing system when the predetermined condition is satisfied.

According to another aspect of the invention, there is provided with a computer program product defining a procedure to be executed by a computer employed in a communication system, the communication system including a communication device provided with an accessing system capable of accessing web pages, at least one operation member attachable to the communication device, the at least one operation member being operable with being attached to the communication system, the at least one operation member being provided with a data storage containing first access data which is used by the communication device to access a first predetermined web page, and a transmitting system that transmits the first access data contained in the data storage to the accessing system when the at least one operation member is operated while it is attached to the communication device, the accessing system accessing the first predetermined web page based on the first access data transmitted from the data storage of the at least one operation member, the computer that executes the procedure defined by the computer program product functioning as the transmitting system.

Optionally, the transmitting system may be included in the at least one operation member, the transmitting system determining whether a predetermined condition is satisfied when the at least one operation member is operated with being attached to the communication system, the transmitting system transmitting the first access data contained in the data storage to the accessing system when the predetermined condition is satisfied.

DESCRIPTION OF THE ACCOMPANYING DRAWINGS

FIG. 1 is a block diagram showing a control system of a multi-function peripheral according to the invention;

FIG. 2 an appearance of the multi-function peripheral shown in FIG. 1;

FIG. 12 is a flowchart illustrating a modification of the access data output procedure.

DESCRIPTION OF THE EMBODIMENTS

Hereinafter, referring to the accompanying drawings, multi-function peripherals (MFPs) 1 according to embodiments of the present invention will be described.

First Embodiment

Figure 1:
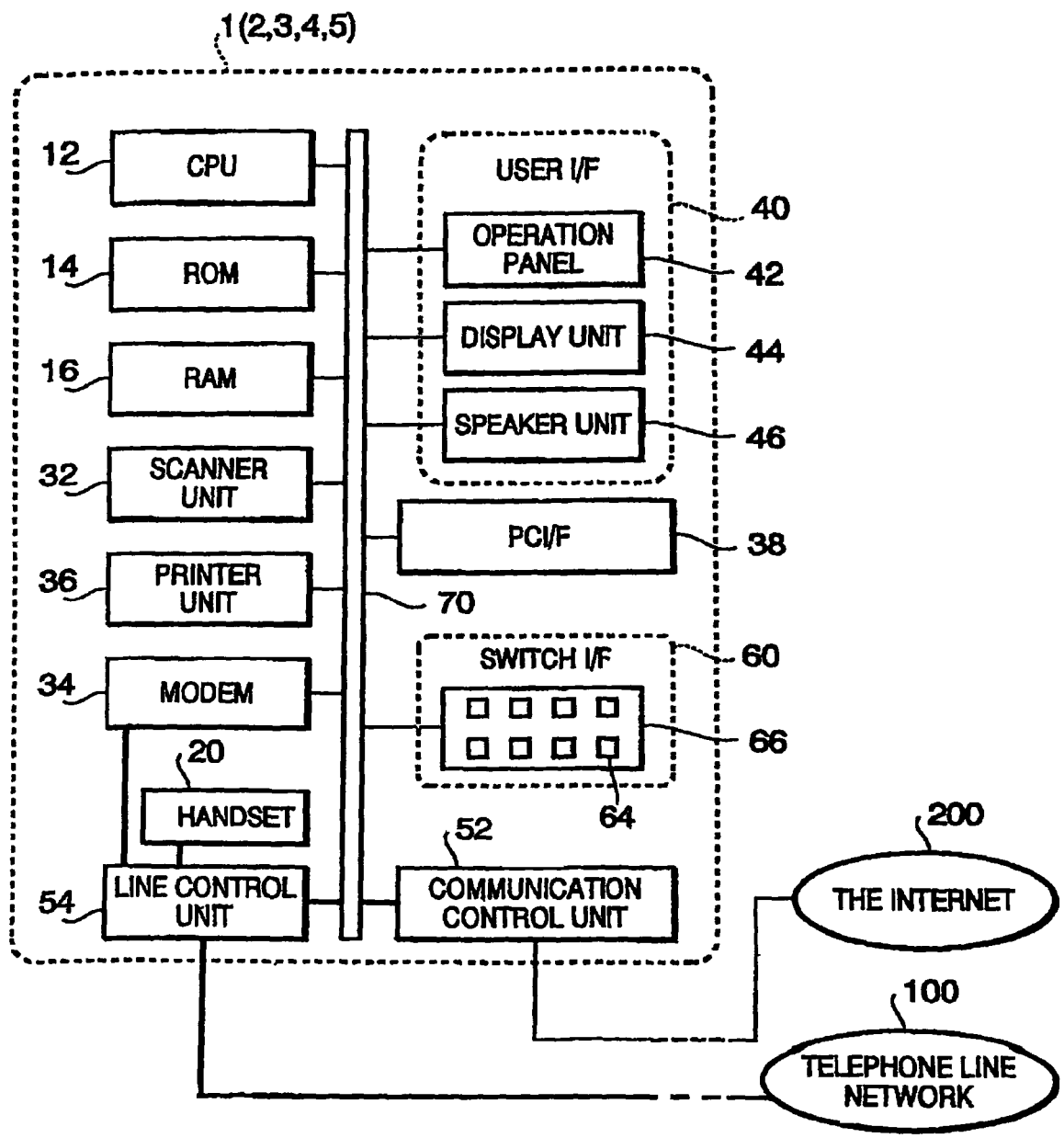
Figure 2:
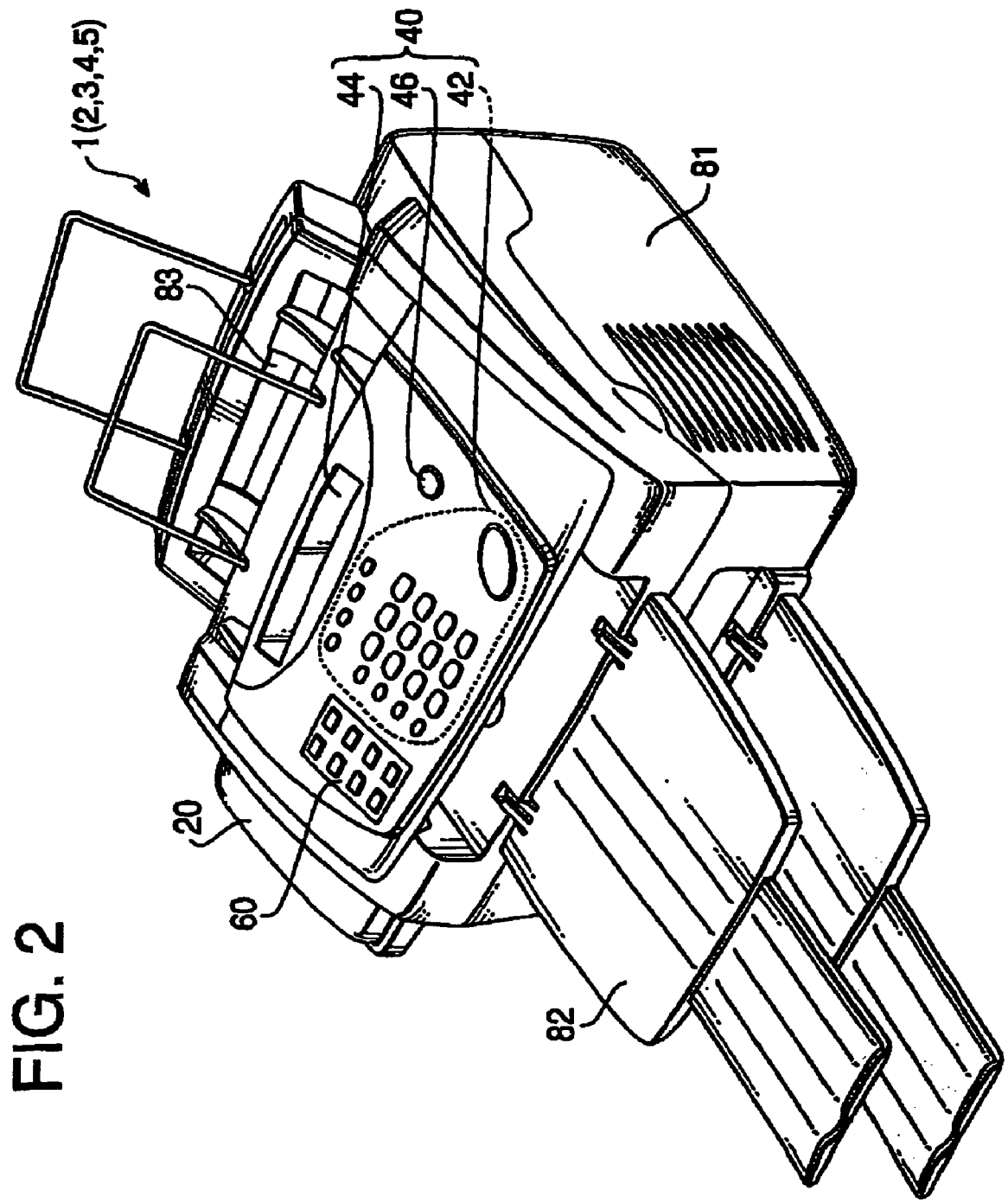

FIG. 1 shows a control system of the MFP 1 according to a first embodiment of the invention. The MFP 1 The MFP 1 has a function of executing audio communication through a public telephone line 100, a function of transmitting image data through the public telephone line 100, and a function of printing a web page, which is accessible through the Internet 200, on a recording sheet. The third function will be referred to as a web print function hereinafter.

The MFP 1 has, as shown in FIG. 1, a CPU 12, a ROM 14, a RAM 16, a handset 20, a scanner unit 32, a modem 34, a printer unit 36, a PC interface unit (hereinafter referred to as a PC I/F) 38, a user interface unit (hereinafter referred to as user I/F) 40, a communication control unit 52, and a line control unit 54, a switch interface (hereinafter referred to as a SW I/F) 60, which are interconnected through a bus 70.

The CPU 12 controls an entire operation of the MFP 1 by executing various procedures, which are stored in the ROM 14 (e.g., a type of computer-readable storage medium) in the form of programs, with storing results of procedures in the RAM 16 and transmitting commands to respective units of the MFP 1 through the bus 70.

The CPU 12 achieves a function of accessing web pages by executing communication software stored in the ROM 14. The communication software represents a procedure for controlling the communication control unit 52 to transmit an HTTP request to servers on the Internet 200 for web page data based on the HTTP (Hyper Text Transfer Protocol), and to receive the web page data transmitted from the server as an HTTP reply.

The handset 20 is transmitter/receiver provided on a side surface of a casing 81 of the MFP 1. The handset 20 is connected to, and is picked up from the casing 81 when in use. The scanner unit 32 functions, in response to a command from the CPU 12, to scan an image on an original placed on a original sheet tray 82 provided on a front surface of the casing 81 and to generate image data of the scanned image.

The modem 34 functions, under control of the CPU 12, to modify image data generated by the scanner unit 32 to generate image signal that can be transmitted through the telephone line 100, and generates image data by demodulating the image signal input from the telephone line 100 via the line control unit 54.

The printer unit 36 functions, under control of the CPU 12, to print out images (characters/letters) on the recording sheet which is placed on a recording sheet tray 83 provided on a rear surface of the casing 81.

The user I/F 40 is provided on a top surface of the casing 81, and includes an operation panel 42 provided with a plurality of keys and switches, a display panel 44 that displays various information on its screen, a speaker unit 46 having speakers and a driving circuit for the speakers.

The PC I/F 38 is an interface for connecting the MFP 1 with another computer system through a communication cable. With the PC I/F 38, it becomes possible to execute data communication between the MFP 1 and the external computer system.

The communication control unit 52 functions, under control of the CPU 12, to receive packet data from an external device and/or transmitting packet data to an external device, through the Internet 200.

The line control unit 54 transmits/receives various signals through the telephone line 100. The line control unit 54 sets, under control of the CPU 12, transmission paths through which the signals are transmitted to and/or received from the telephone line 100. The transmission paths are set such that, when the handset 20 is picked up from the MFP 1 (i.e., an off-hook operation is performed by the user), the path directed from the line control unit 54 to the handset 20 is set to the transmission path, through which the audio signal can be transmitted. The thus set transmission path is released when the image signal transmission through the modem 34 is finished or the handset 20 is returned to the MFP 1 (i.e., an on-hook operation is performed). When the handset 20 is in the on-hook condition, the image signal is not transmitted through the path.

Figure 3:
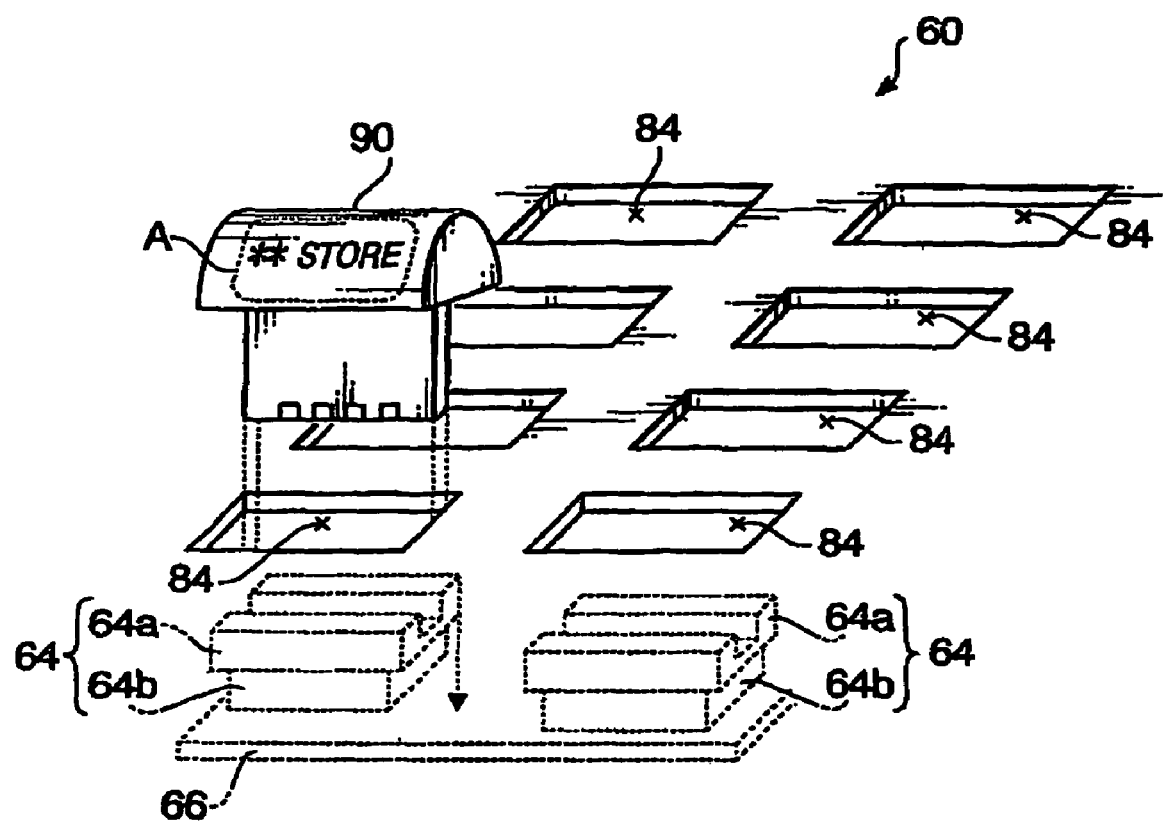
FIG. 3 is a perspective view showing a portion around a switch interface of the multi-function peripheral shown in FIG. 2.

The SW I/F 60 is provided on the top surface of the casing 81 as well as the user I/F 40. FIG. 3 shows a structure of the SW I/F 60. The SW I/F 60 includes a plurality of interface units 64 and a base plate 66 on which the interface units 64 is securely mounted. On the casing 81, at positions corresponding to the interface units 64, openings 84 are formed. A plurality of switch devices 90 (which will be described later) can be mounted to the interface units 64 through the openings 84, respectively. Each interface unit 64 is provided with a fixing unit 64a for fixedly mounting the switch device 89, and a switch mechanism 64b configured to be a momentary switch.

Each interface unit 64 and the base plate 66, when the switch device 90 is attached, is provided with a first closed circuit. When the first closed circuit is closed, an identifying signal for identifying the interface unit 64 to which the switch device 90 is coupled and a notifying signal for notifying that the switch device 90 is coupled are transmitted from the base plate 66 to the CPU 12 through the bus 70. After the first closed circuit is closed, while the switch device 90 is attached to the SW I/F 60, the CPU 12 and the switch device 90 are capable of communicating with each other through the first closed circuit and the bus 70.

Further, each interface unit 64 and base plate 66 are provided, when the switch device 90 is coupled, with a second closed circuit which is neutrally opened and is closed when the switch device 90 is depressed in the direction indicated by arrow shown by broken line in FIG. 3. When the second closed circuit is closed, a depression notifying signal indicative of a depression of the switch device 90 is transmitted, as well as the identifying signal described above, from the base plate 66 to the CPU 12 through the bus 70. Thus, when the switch device 90 is being depressed, the switch device 90 and the CPU 12 can perform data communication through the second closed circuit and the bus 70.

It should be noted that the switch device 90 is a detachably attached to the SW I/F 60 of the MFP 1, and is operable when attached to the SW I/F 60. Therefore, the switch device 90 may be distributed to users of the MFPs 1 as an attachment of a commercial product such as a magazine, or may be sold independently.

Figure 4:
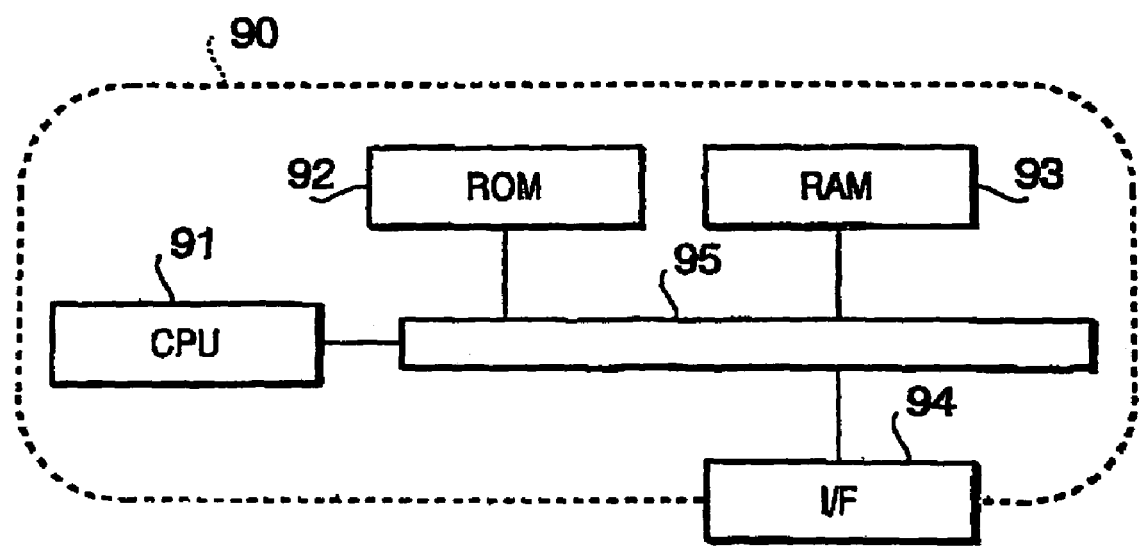
FIG. 4 is a block diagram showing an electrical configuration of the switch device.

FIG. 4 show a block diagram of the switch device 90 according to the first embodiment.

As shown in FIG. 4, the switch device 90 is provided with a CPU 91, a ROM 92, a RAM 93 and an interface unit 94, which are interconnected through a bus 95.

The CPU 91 controls an entire operation of the switch device 90 by executing various procedures, which are stored in the ROM 92 as programs, with storing results of procedures in the RAM 93 and transmitting commands to respective units of the switch device 90 through the bus 95. The ROM 92 stores, besides the programs to be executed by the CPU 91, access data to be referred in an access data procedure (FIG. 5; described later), and allowed number data referred to in the access data procedure are stored.

The access data is data used for accessing a predetermined web page through the Internet 200, and is data indicative of a URL (Uniform Resource Locator). The allowed number data is data representing a number p of times by which a user is allowed to access the web page indicated by the access data. In the first embodiment, the allowed number data is set to a negative value when the number of times the user is allowed to access the web page is not limited.

As shown in FIG. 3, the switch device 90 is formed with an indication area A on a top surface thereof for indicating data of the web page accessible using the access data stored in the ROM 92. The indication area A can be seen by the user when the switch device 90 is attached to the SW I/F 60.

Figure 5:
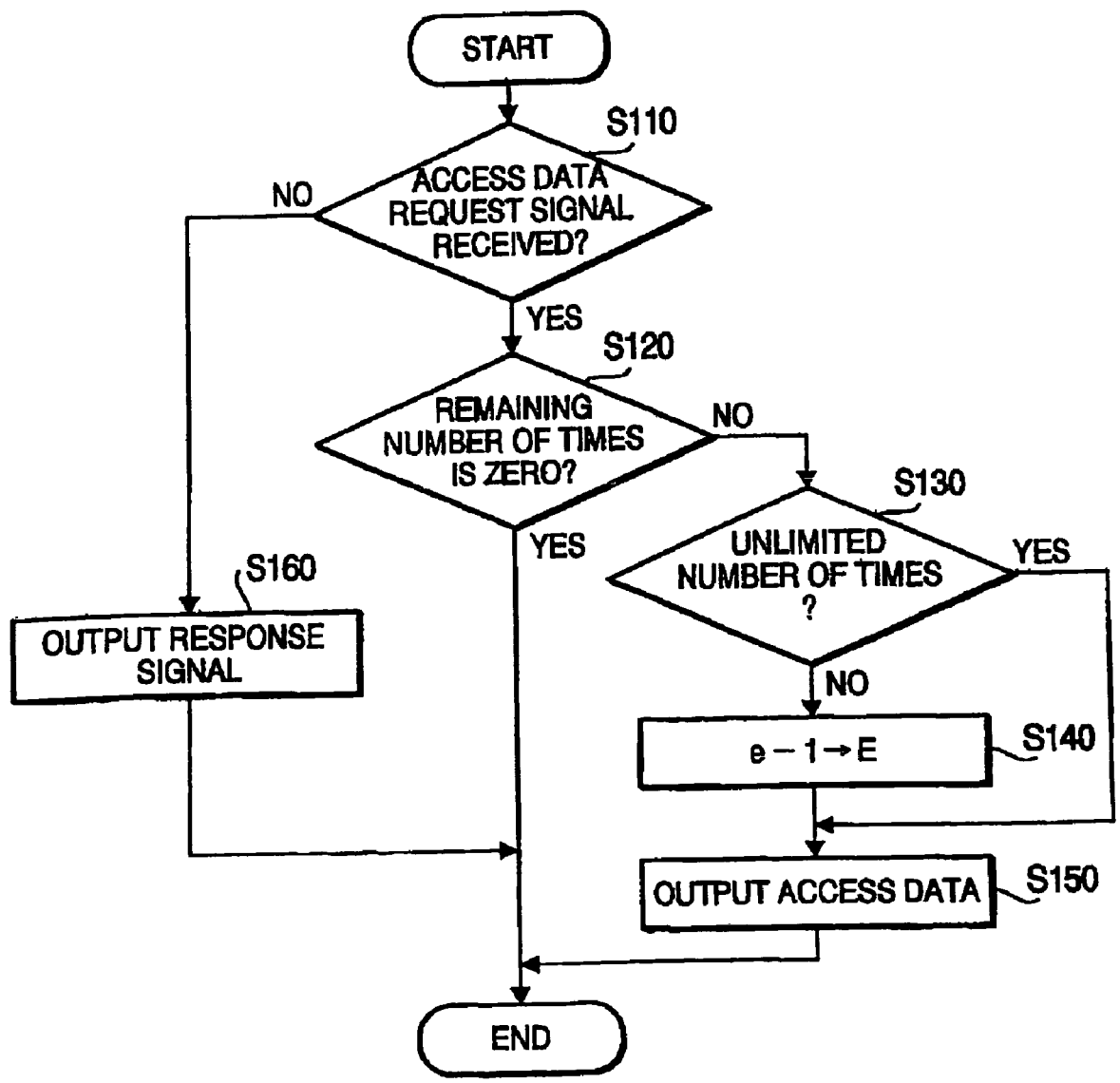
FIG. 5 is a flowchart illustrating an access data output procedure according to a first embodiment of the invention.

Next, the access data output procedure executed by the CPU 91 of the switch device 90 will be described. FIG. 5 is a flowchart illustrating the access data output procedure. The access data output procedure is started when a signal is transmitted from outside (i.e., the MFP 1) through the interface unit 94.

In S101, the CPU 91 checks the signal input from the outside. When the signal is an access data requesting signal, which requires transmission of the access data (S110: YES), the CPU 91 further examines whether the remaining number of times by which access to the web page using the access data is zero (S120). Specifically, in step S120, a value e of a variable E is examined. The variable E is stored in the RAM 94 and is set to a value p, which is a value indicated by the allowed number data, as an initial value. The value e of the variable E is decremented by one every time step S140 for outputting the access data is executed. Therefore, by examining the value e of the variable E, the remaining number of times by which access to the web page can be allowed is obtained. The access data requesting signal is output by the MFP 1 in the access management procedure (see FIG. 6; described later).

When the remaining number of times by which the user is allowed to access the web page is zero (S120: YES), the CPU 91 finishes the access data procedure. Thus, when the remaining number is zero (i.e., e=0), the access data will not be output to an external device (e.g., the MFP 1).

When the remaining number of times is not zero (S120: NO), the CPU 91 further examines whether the unlimited number of accesses are allowed in S130. As described above, when the unlimited number of accesses are allowed, the value e of the variable E is set to be a negative value (i.e., e<0). Accordingly, in S130, by examining the value e of the variable, the determination is made. When the value e of the variable E is negative (S130: YES), control proceeds to S150. When the value e of the variable E is not negative, that is, positive (S130: NO), the number of accesses is limited and control proceeds to S140.

In S140, the CPU 91 decreases the value e of the variable E by one, and the result is set as the value e of the variable E. Thus, every time when step S140 is executed, the value e of the variable E is decremented by one.

After S140 is executed, or when the unlimited number of accesses are allowed (S130: YES), the CPU 91 output the access data stored in the ROM 92 to the external device (i.e., MFP 1) in S150, and then finishes the access data output procedure.

When the signal input from the external device (i.e., the MFP 1) is a count inquiry signal which inquires the switch device 90 for the remaining number of times by which the user can access the web page (S110: NO), the CPU 91 outputs a response signal notifying the remaining number of times to the external device (i.e., MFP 1) in S160, and then finishes the access data output procedure. It should be noted that data representing the value e of the variable E is output as the response signal. It should be noted that the count inquiry signal received in S110 is a signal output by the MFP 1 during the access management procedure shown in FIG. 6.

When the signal input from the external device is not the access data request signal (S110: NO), a procedure other than the above-described procedure may be executed. However, such procedures may be known to persons skilled in the art, and are not essential in view of the present invention. Therefore, description of such procedures will not be provided for the sake of brevity.

Next, the access management procedure executed by the CPU 12 of the MFP 1 will be described.

Figure 6:
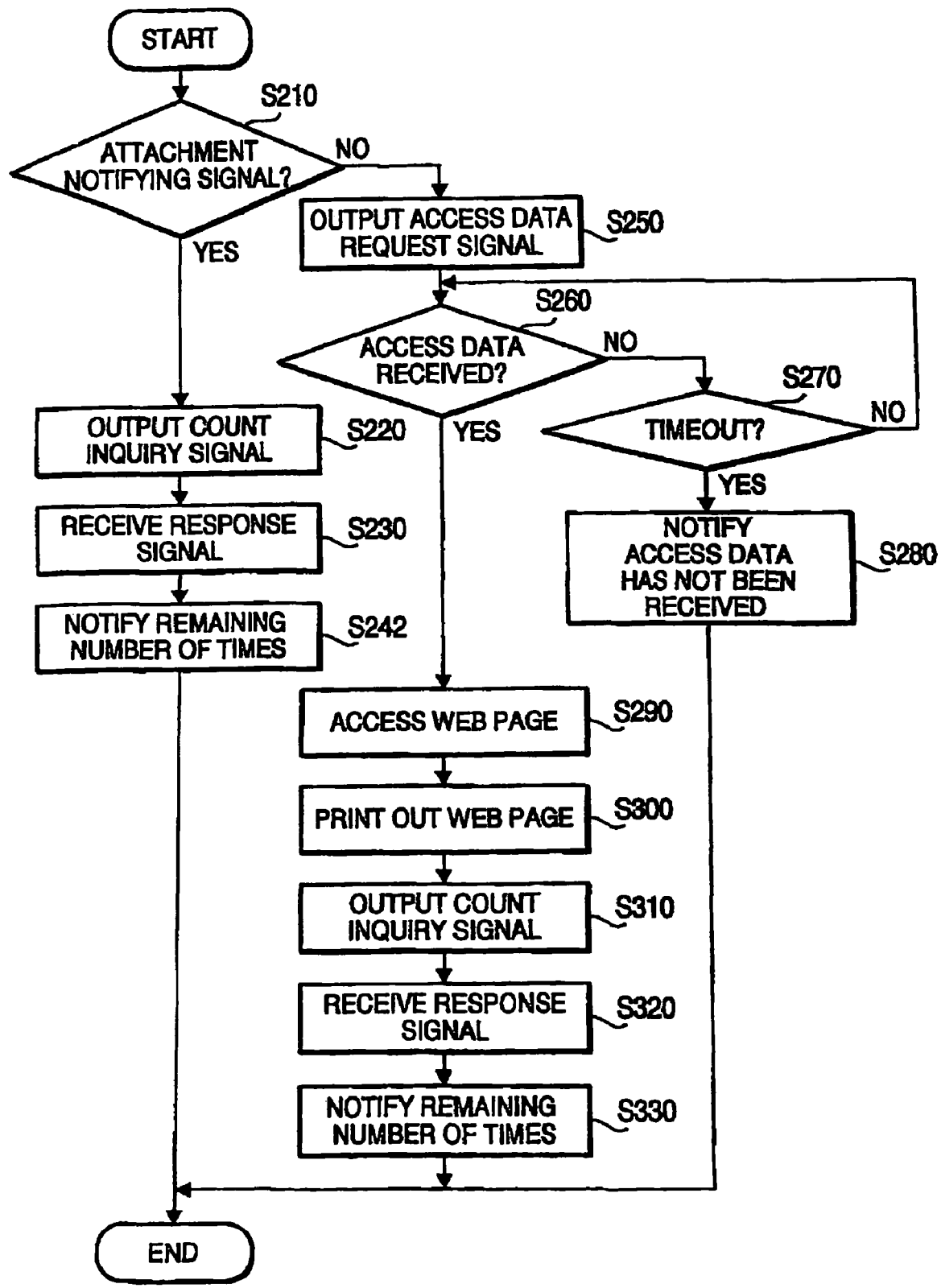
FIG. 6 is a flowchart illustrating an access management procedure according to the first embodiment of the invention.

FIG. 6 is a flowchart illustrating the access management procedure, which is started when a signal is received by the SW I/F 60.

In S210, the CPU 12 examines the signal received by the SW I/F 60. When the signal received by the SW I/F 60 is an attachment notifying signal (S210: YES), which notifying that a switch device is attached to the SW I/F 60 (i.e., one of the interface units 64), then the CPU 12 outputs a count inquiry signal inquiring the remaining number of times by which the user is allowed to access the web page using the access data to the switch device 90 (S220). It should be noted that, in S220; the count inquiry signal is transmitted to the interface unit 64 which is identified by the identifying signal that is received together with the attachment notifying signal. As described above, the count inquiry signal serves as a trigger for the switch device to execute the access data output procedure (see FIG. 5), and the switch device 90 outputs the response signal indicating the remaining number of accesses as a response (S160 of FIG. 5).

In S230, the CPU 12 receives the response signal from the switch device 90 through the SW I/F 60. In S240, the CPU 12 notifies the remaining number of times by which the user can access the web page to the user of the MFP 1. According to the MFP 1 of the first embodiment, the remaining number is displayed on a display panel 44 of the user I/F 40 for a predetermined period (two seconds, according to the first embodiment).

When the signal received by the SW I/F 60 is a depression notifying signal (S210: NO), which notifies that the switch device 90 is being depressed, then the CPU 12 outputs the access data request signal requesting the switch device 90 for the access data (S250). It should be noted that, in S150, the access data request signal is transmitted to the interface unit 64 identified by the identifying signal which is received together with the depression notifying signal. Further, the CPU 12 starts a timer to start measuring a time period when the access data request signal is output.

The access data request signal serves as a trigger for the switch device 90 to start the access data output procedure (see FIG. 5), and the switch device 90 outputs the access data in response to the access data request signal if the remaining number of accesses is not zero (S150).

In S260, the CPU 12 determines whether the access data is received through the SW I/F 60. When the access data has not been received (S260: NO), the CPU 12 executes a time-out check (S270). That is, in S270, the CPU 12 determines whether a predetermined period (two second, according to the embodiment) has elapsed since the timer was started in S250.

When the predetermined time has not elapsed (S270: NO), control returns to S260. When the predetermined time has elapsed (S270: YES), the CPU 12 notifies that the access data has not been received from the switch device 90 (S280), and finishes the access data management procedure. In S280, the CPU 12 displays a message indicating that the access data has not be received for a predetermined period (two seconds, according to the first embodiment) on the display panel 44 of the user I/F 40. As is described when S120 of FIG. 5 is described, when the time-out occurs after the CPU 12 transmits the access data request signal, the remaining number of times by which the user is allowed to access the web page is zero. Therefore, in S280, the CPU 12 also notifies that the remaining number is zero by displaying such a message on the display panel 44 for a certain period of time (e.g., two seconds).

When the CPU 12 receives the access data (S260: YES), the CPU 12 accesses the web page based on the access data as received (S290). In S300, the CPU 12 prints out the accessed web page on the recording sheet using the printer unit 36. Thus, the user of the printer can browse the web page as printed out on the recording sheet.

In S310, the CPU 12 outputs the count inquiry signal to the switch device 90. This step is similar to step S220. Then, in S320, the CPU 12 receives the count response signal from the switch device 90 through the SW I/F 60, which is similar to step S230. Then, in S330, the CPU 12 notifies the remaining number represented by the received count response signal, which is similar to step S240, and the CPU 12 finishes the procedure shown in FIG. 6.

When the signal received from the switch device 90 is not the attachment notifying signal or the depression notifying signal, a procedure other than the above-described procedure shown in FIG. 6 may be executed. However, such procedures are not essential in view of the present invention. Therefore, description of such procedures will not be provided for the sake of brevity.

According to the MFP 1 configured as described above, When the switch device 90 is attached to the SW I/F 60, and depressed, the MFP 1 accesses a web page which is indicated by the access data stored in the switch device 90 (S250-S290 of FIG. 6). When the user intends to access the web page at a later stage, it is unnecessary to re-attach the switch device 90. Only by depressing the switch device 90, the MFP 1 accesses the web page again. Therefore, when the MFP 1 is used together with the switch device 90, the user can access the web page repeatedly with ease.

When the allowed number data stored in the ROM 92 is set to a negative value, the switch device 90 outputs the access data to the MFP 1 whenever the user depresses the switch device 90 without any limitation.

Further, the switch device 90 is configured such that the number of times by which the user depresses the switch device 90 and accesses the web page is counted, and only when the counted number is less than the allowed number, the switch device 90 outputs the access data to the MFP 1 so that it can access the web page. Therefore, with use of the MFP 1 and switch device 90, it is possible to restrict the number of times the user of the MFP 1 can access the web page by setting the allowed number data which is stored in the switch device 90.

In S270 of FIG. 6, the CPU 12 detects the time-out status, i.e., the access data has not been received for the predetermined period, and in S280, the CPU 12 notifies that the access data has not been received, and that the remaining number of times is zero. Thus, the user of the MFP 1 can recognize that the remaining number of times is zero. With this configuration, the user does not misunderstand that he/she has not depressed the switch device 90 or some trouble has occurred.

In S240 and S330 of FIG. 6, the CPU 12 notifies the number represented by the count response signal, which is output by the switch device 90 in response to the count inquiry signal. That is, the CPU 12 notifies the remaining number of times by which the user may access the web page. Thus, the user can confirm the remaining number of times with this notification.

Since the switch mechanism 64*b* is provided to the SW I/F 60 for operating the switch device 90. Therefore, when the switch device 90 is not attached to the MFP 1, the user cannot operate the switch device 90. Accordingly, data exchange between the switch device 90 and the CPU 12 when the switch device 90 is not attached to the SW I/F 60 can be prevented.

In S300 of FIG. 6, the web page accessed in S290 is printed out. Therefore, the user can browse the web page viewing the printed sheet.

Since the switch device 90 is configured such that the data related to the web page is formed on the indication area A, the user can operate the switch device 90 corresponding to the web page to be accessed without fail when the switch device 90 is attached to the SW I/F 60.

Second Embodiment

Next, an MFP 2 according to a second embodiment will be described. The structure of the MFP 2 is similar to the MFP 1 according to the first embodiment, and accordingly, FIG. 1 shows the block diagram of the control system of the MFP 2. In the following description, differences between the MFP 1 and MFP 2 will be mainly explained.

Figure 7:
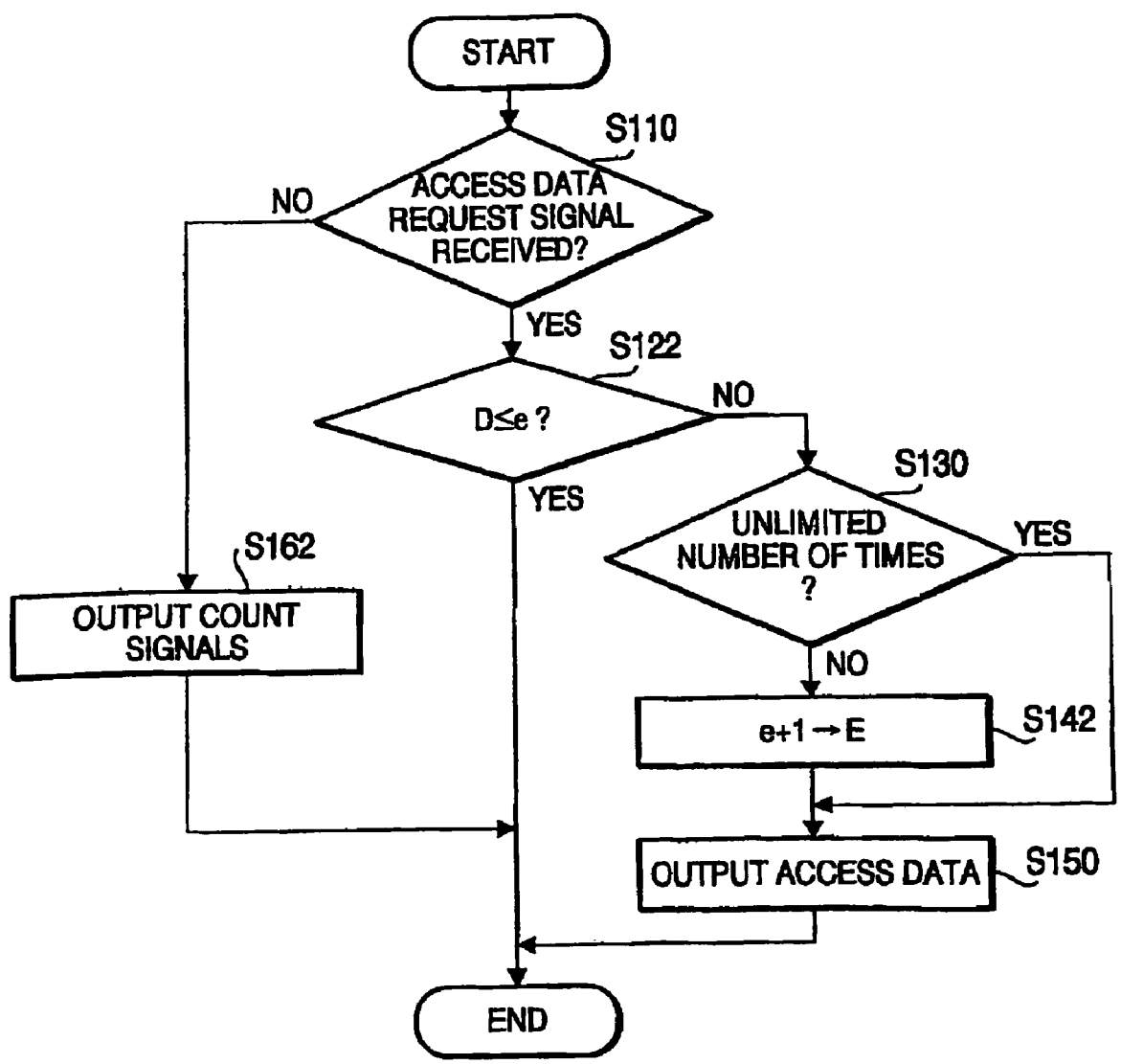
FIG. 7 is a flowchart illustrating an access data output procedure according to a second embodiment of the invention.

FIG. 7 shows an access data output procedure according to the second embodiment. FIG. 7 is similar to FIG. 5 except that steps S120, S140 and S160 are replaced with steps S122, S142 and S162, respectively.

In S110, the CPU 91 examines the signal input from the external device. When the input signal is the access data request signal (S110: YES), the CPU 91 determines whether the access to the web page is allowed (S122). In S122, by examining the value p represented by the allowed number data and the value e of the variable E are examined to determine whether the access is allowed. According to the second embodiment, the variable E is set to zero as the initial value. Then in a following step (i.e., S142), the variable is incremented by one every time when the CPU 91 outputs the access data. When the value e of the variable E has not reached the value p (e<p) (S122: NO), the CPU 91 determines that the access to the web page should be allowed, otherwise (p≦e) (S122: YES), the CPU 91 determines that the access to the web page should not be allowed.

When the access should not be allowed (S122: YES), the CPU 91 finishes the access data output procedure. When the CPU 91 determines that the access to the web page is to be allowed (S122: NO), the CPU 91 determines whether the unlimited number of accesses are allowed in S130.

When the number of accesses is limited (S130: NO), the CPU 91 increments the variable E by one (i.e., e=e+1) in S142. That is, every time when S142 is executed, the value e of the variable E is incremented by one.

When the step S142 is finished or when the unlimited number of accesses are allowed (S130: YES), the CPU 91 outputs the access data stored in the ROM 92 to the external device (i.e., MFP 2) in S150, and finishes the access data output procedure.

When the signal input from the external device is the count inquiry signal (S110: NO), the CPU 91 outputs the count response signal to the external device (i.e., MFP 2) in S162, and finishes the access data output procedure. In S162, data representing the value e of the variable E is output as a first count response signal, and data representing the value p (the allowed number data) is output as a second count response signal.

Figure 8:
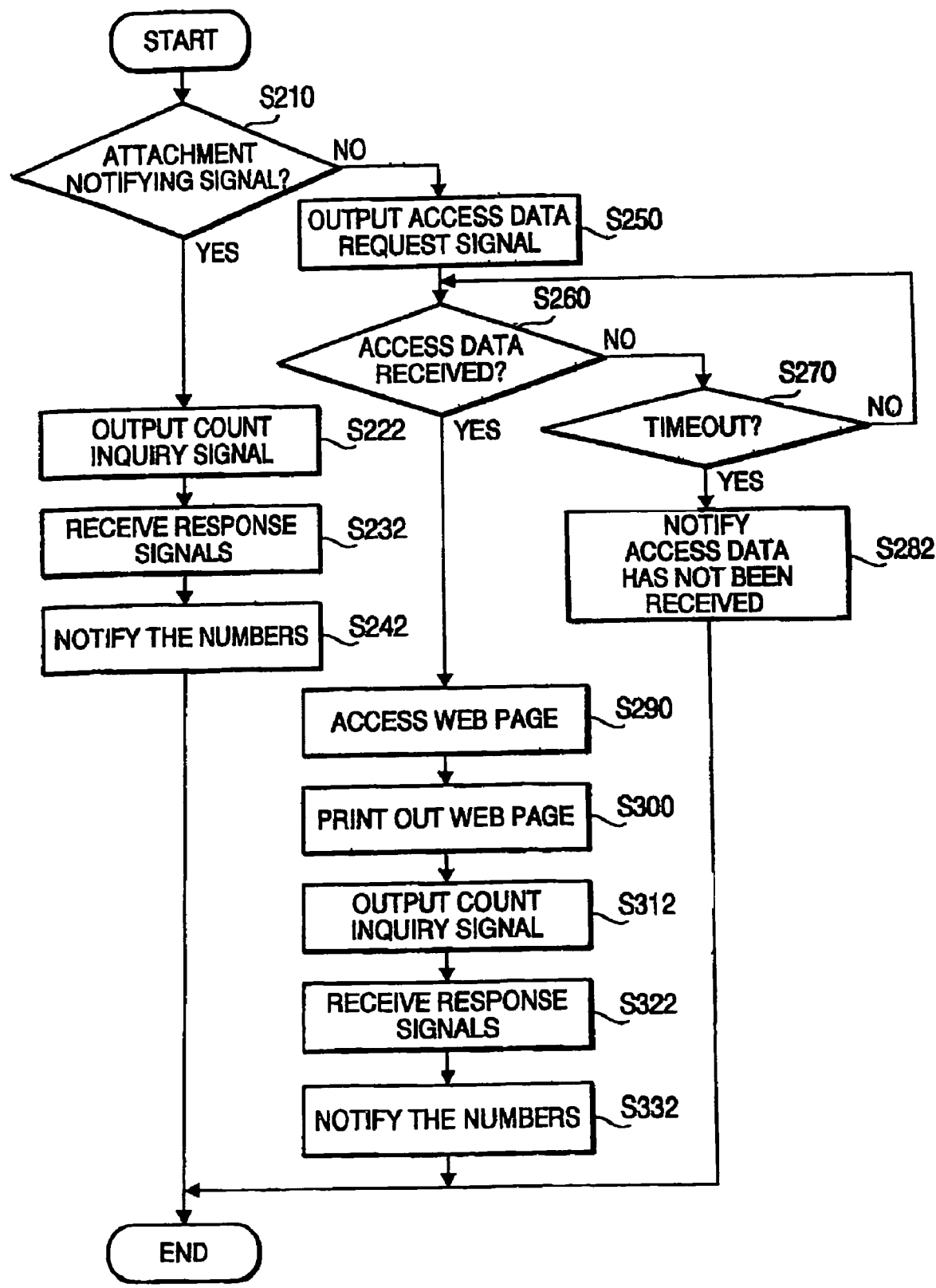
FIG. 8 is a flowchart illustrating an access management procedure according to the second embodiment of the invention.

Next, the access management procedure executed by the CPU 12 of the MFP 2 according to the second embodiment will be described. FIG. 8 shows a flowchart illustrating the access management procedure according to the second embodiment. FIG. 8 is similar to FIG. 6 except that steps S220, S240, S280, S310 and S320 are replaced with steps S2222, S242, S282, S312 and S322, respectively.

In S210, the CPU 12 examines the signal input from the external device (i.e., MFP 2). When the signal received through the SW I/F 60 is the attachment notifying signal (S210: YES), the CPU 12 outputs the count inquiry signal to the switch device 90 (S222). The switch device 90 outputs, in response to the count inquiry signal, the first count response signal representing the number of times by which the user of the MFP 2 accessed the web page (i.e., the value e of the variable) and the second count response signal representing the maximum number by which the user is allowed to access the web page (i.e., the value p stored in the ROM 92 of the switch device 90) in S162 as described above.

In S230, the CPU 12 receives the count response signals from the switch device 90 through the SW I/F 60. Then, the CPU 12 notifies the numbers represented by the count response signals received in S230 to the used in S242. In S242, the CPU 12 notifies the number of times by which the user has accessed the web page represented by the first count response signal and the maximum number by which the user is allowed to access the web page represented by the second count response signal are displayed on the display panel 44 of the user I/F 40 for a predetermined period.

In S210, when the signal input through the SW I/F 60 is the depression notifying signal (S210: NO), the CPU 12 outputs the access data request signal to the switch device 90 (S250). Then, in S270, the CPU 12 determines whether the access data is received from the switch device 90 through the SW I/F 60 (S260).

In S260, when the access data has not been received (S260: NO), the CPU 12 executes a time-out check, that is, the CPU 12 determines whether the access data has not been received for a predetermined period (S270). When the predetermined period has not elapsed (S270: NO), control returns to S260.

When the predetermined period has elapsed (S270: YES), the CPU 12 notifies that the access data has not been received from the switch device 90 (S282), and finishes the access management procedure. In S282, the CPU 12 displays a message indicating the access data has not been received on the display panel 44 of the user I/F 40 for a predetermined period.

As explained when S122 of FIG. 7 is described, when the time-out status occurs after the CPU 12 outputs the access data request signal, the access to the web page is not allowed. Therefore, in S282, a message indicating that the access is not allowed may also be displayed for a predetermined period by displaying the message on the display panel 44 of the user I/F 40.

Steps S290 and S300 are similar to those in FIG. 6. Further, steps S312 through S332 are similar to steps S222 through S242 of FIG. 6.

It should be noted that the configuration of the MFP 2 similar to that of the MFP 1 provides the similar effect as is achieved provided by the MFP 1. Further, according to the configuration only provided to the MFP 2, the following advantages are further provided.

According to the steps S242 and S332 of FIG. 8, the CPU 12 notifies the number of times by which the user has accessed the web page and the maximum number of times the user is allowed to access the web page based on the first and second count response signals received from the switch device 90.

Further, in S222 of FIG. 8, when the switch device 90 is attached to the SW I/F 60, the CPU 12 outputs the count inquiry signal to the switch device 90, and in S312, the CPU 12 outputs the count inquiry signal when the switch device 90 is depressed, and receives the first and second count response signals in S242 and S332. Accordingly, the user is notified with the number of times the user has accessed the web page and the maximum number of times the user is allowed to access the web page on that timing.

Third Embodiment

An MFP 3 according to a third embodiment of the invention will be described. The structure of the MFP 3 is similar to the MFP 1 according to the first embodiment, and accordingly, the control system of the MFP 3 is similar to that of MFP 1 shown in FIG. 1. In the following description, differences between the MFP 1 and MFP 3 will be mainly explained.

Figure 9:
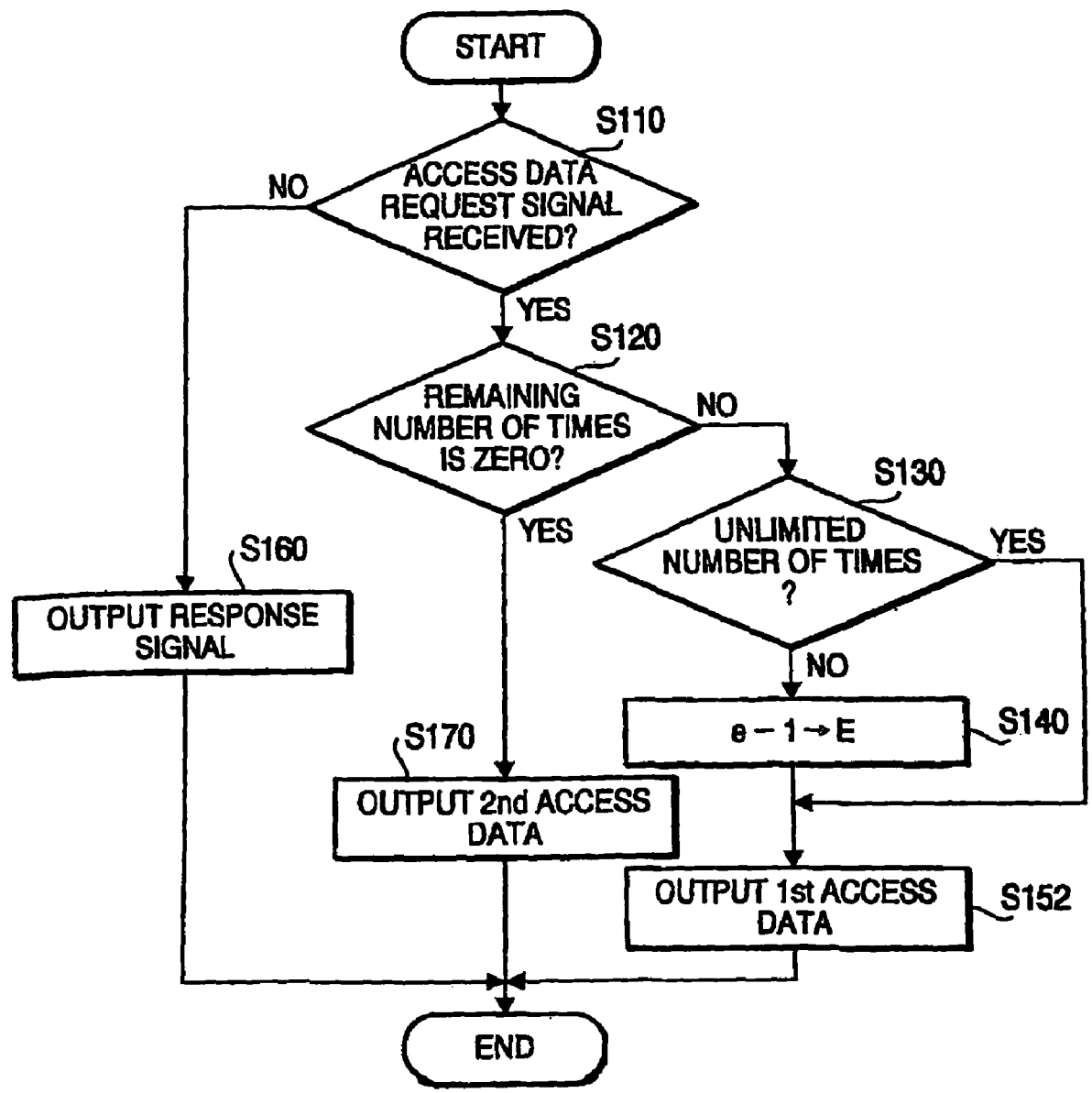
FIG. 9 is a flowchart illustrating an access data output procedure according to a third embodiment of the invention.

According to the MFP 3, the switch device 90 is configured to output first and second access data during execution of an access data output procedure shown in FIG. 9. For this purpose, according to the third embodiment, the first access data, the second access data and the allowed number data are stored in different areas of the ROM 92. The web page indicated by the first access data is similar to the access data referred to in the first or second embodiment. The web page indicated by the second access data may be one indicating that the remaining number of times becomes zero, one inducing the user to obtain (buy) a new switch device 90 or one instructing the user to increase the remaining number of times.

FIG. 9 is a flowchart illustrating the access data output procedure according to the third embodiment. It should be noted that FIG. 9 is similar to FIG. 5 except that S170 is added, and S150 of FIG. 5 is replaced with S152.

When the remaining number of times the user is allowed to access the web page is not zero (S120: NO), after the execution of S140 or when the unlimited number of accesses are allowed (S130: YES), the CPU 91 outputs the first access data stored in the ROM 92 in S152. As described above, the first access data is similar to the access data of the first embodiment or the second embodiment. That is, the web page indicated by the first access data corresponds to the information formed on the indication area A on the top surface of the switch device 90. After outputting the first access data, the CPU 91 finishes the access data output procedure.

In S120, when the CPU 91 determines that the remaining number of times the user is allowed to access the web page is zero (S120: YES), the CPU 91 outputs the second access data stored in the ROM 92 to the external device (i.e., MFP 3), and finishes the access data output procedure. According to the third embodiment, when the remaining number of times is zero (S120: YES), the access data (i.e., the second access data) is output by the switch device 90. Therefore, in the access management procedure executed in the MFP 3 (see FIG. 6), the CPU 12 only notifies that the intended access data (i.e., the first access data) has not been received in S280.

It should be noted that the configuration of the MFP 3 similar to that of the MFP 1 provides the similar effect as is achieved provided by the MFP 1. Further, according to the configuration only provided to the MFP 3, the following advantages are further provided.

As described above, when the remaining number is zero, the switch device 90 outputs the access data (i.e., the second access data) to the external device (i.e., MFP 3) so that the CPU 12 can access the web page indicated by the second access data. Thus, it is possible to have the user browse different web pages depending on the remaining number of times.

Fourth Embodiment

An MFP 4 according to a fourth embodiment of the invention will be described hereinafter. The structure of the MFP 4 is similar to the MFP 1 according to the first embodiment, and accordingly, the control system of the MFP 4 is similar to that of MFP 1 shown in FIG. 1. In the following description, differences between the MFP 1 and MFP 4 will be mainly explained.

According to the fourth embodiment, the structure of the switch device 90 is slightly different from that in the first through third embodiments. That is, according to the fourth embodiment, the switch device 90 is configured such that the CPU 91 is eliminated from the structure shown in FIG. 4. According to the fourth embodiment, the RAM 93 stores readout number data representing a number r of times by which the access data has been read out by the MFP 4. The number r is given an initial value of zero.

Figure 10:
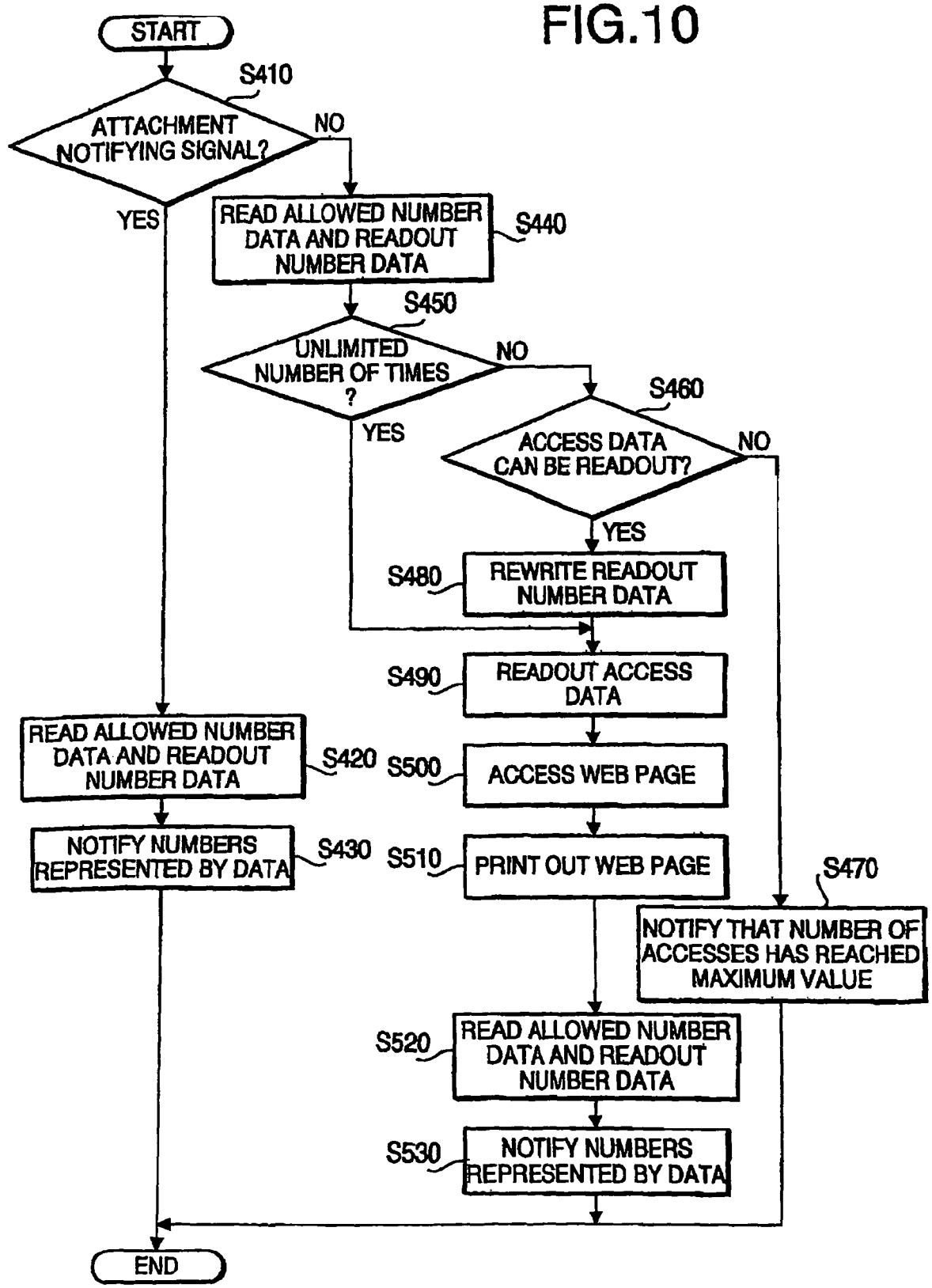
FIG. 10 is a flowchart illustrating an access management procedure according to a fourth embodiment of the invention.

Next, the access management procedure according to the fourth embodiment will be described. FIG. 10 is a flowchart illustrating the access management procedure according to the fourth embodiment. The CPU 12 starts the access management procedure shown in FIG. 10 when the CPU receives a signal through the SW I/F 60.

In S410, the CPU 12 examines the received signal (S410). When the signal received through the SW I/F 60 is the attachment notifying signal (S410: YES), the CPU 12 retrieves the allowed number data and the readout number data from the switch device 90 (S420). In this step, the CPU 12 obtains the data of the switch device 90 which is identified by the identifying signal which is received together with the attachment notifying signal from among the switch devices 90 attached to the SW I/F 60.

In S430, the CPU 12 notifies the numbers respectively represented by the allowed number data and the readout number data. In this step, the CPU 12 displays the number represented by the allowed number data as the maximum number by which the user is allowed to access the web page, and the number represented by the readout number data as the accessed number by which the user has accessed the web page on the display panel 44 of the user I/F 40.

When the signal retrieved through the SW I/F 60 is the depression notifying signal (S410: NO), the CPU 12 retrieves the allowed number data and readout number data from the switch device 90 (S440), which is similar to step S420.

In S450, the CPU 12 determines whether unlimited number of accesses are allowed. According to the fourth embodiment, when the number of accesses of the web page is not limited, the allowed number data represents a negative value. Therefore, in S450, when the value p represented by the allowed number data is negative (p<0), the CPU 12 determines that unlimited number of accesses are allowed, while when the value p is positive (p>0), the CPU 12 determines that the number of accesses is limited.

When the number of times by which the user is allowed to access the web page is limited (S450: NO), the CPU 12 checks, in S460, whether the access data can be read from the switch device 90 based on the data retrieved in S440. In this step (S460), the CPU 12 determines that the access data can be read when a difference between the value p represented by the allowed number data and the value r represented by the readout number data is positive (i.e., p−r>0), otherwise (i.e., p−r≦0), the CPU 12 determines that the access data cannot be read. It should be noted that, when the difference is positive (i.e., p−r>0), the number of times by which the user has accessed the web page has not reached the maximum number of times by which the user is allowed to access the web page.

When the CPU 12 determines that the access data cannot be read (S460: NO), the CPU 12 notifies the user that the number of times by which the user has accessed the web page has reached the maximum number (S470), and finishes the access management procedure. The notification in S470 is made by displaying an appropriate message on the display panel 44 of the user I/F 40 for a predetermined period.

When the CPU 12 determines that the access data can be read (S460: YES), the CPU 12 rewrites the readout number data stored in the RAM 93 (S480). That is, the CPU 12 increments the value r of the readout number data by one in S480. Every time when S480 is executed, the value r of the readout number data is incremented by one.

When step S480 is finished, or unlimited number of accesses are allowed (S450: YES), the CPU 12 reads out the access data from the ROM 92 of the switch device 90 (S490). Then, in S500, the CPU 12 accesses the web page indicated by the access data read out in S490.

In S510, the CPU 12 controls the printer unit 36 to print out the image of the web page as accessed in S500 on the recording sheet. Then, the CPU 12 retrieves the allowed number data and the readout number data from the switch device 90 in S520, which is similar to S420 or S440. Then, the CPU 12 notifies the numbers represented by number data in S530, which is similar to S430.

It should be noted that the configuration of the MFP 4 similar to that of the MFP 1 provides the similar effect as is achieved provided by the MFP 1. Further, according to the configuration provided only to the MFP 4, the following advantage is further provided.

That is, according to the MFP 4, the switch device 90 need not be provided with a CPU, and only by the procedure executed by the CPU 12, the function as in the first embodiment can be realized.

Fifth Embodiment

An MFP 5 according to a fifth embodiment of the invention will be described. The structure of the MFP 5 is similar to the MFP 1 according to the first embodiment, and accordingly, the control system of the MFP 5 is similar to that of MFP 1 shown in FIG. 1. In the following description, differences between the MFP 1 and MFP 5 will be mainly explained.

According to the fifth embodiment, the structure of the switch device 90 is slightly different from that in the first through third embodiments. That is, according to the fifth embodiment, the switch device 90 is configured such that the CPU 91 is eliminated from the structure shown in FIG. 4.

According to the fifth embodiment, the first access data, the second access data and the allowed number data are stored in different areas of the ROM 92 of the switch device 90. Further, the RAM 93 stores readout number data representing a number r of times by which the access data has been read out by the MFP 4. The number r is given an initial value of zero.

Figure 11:
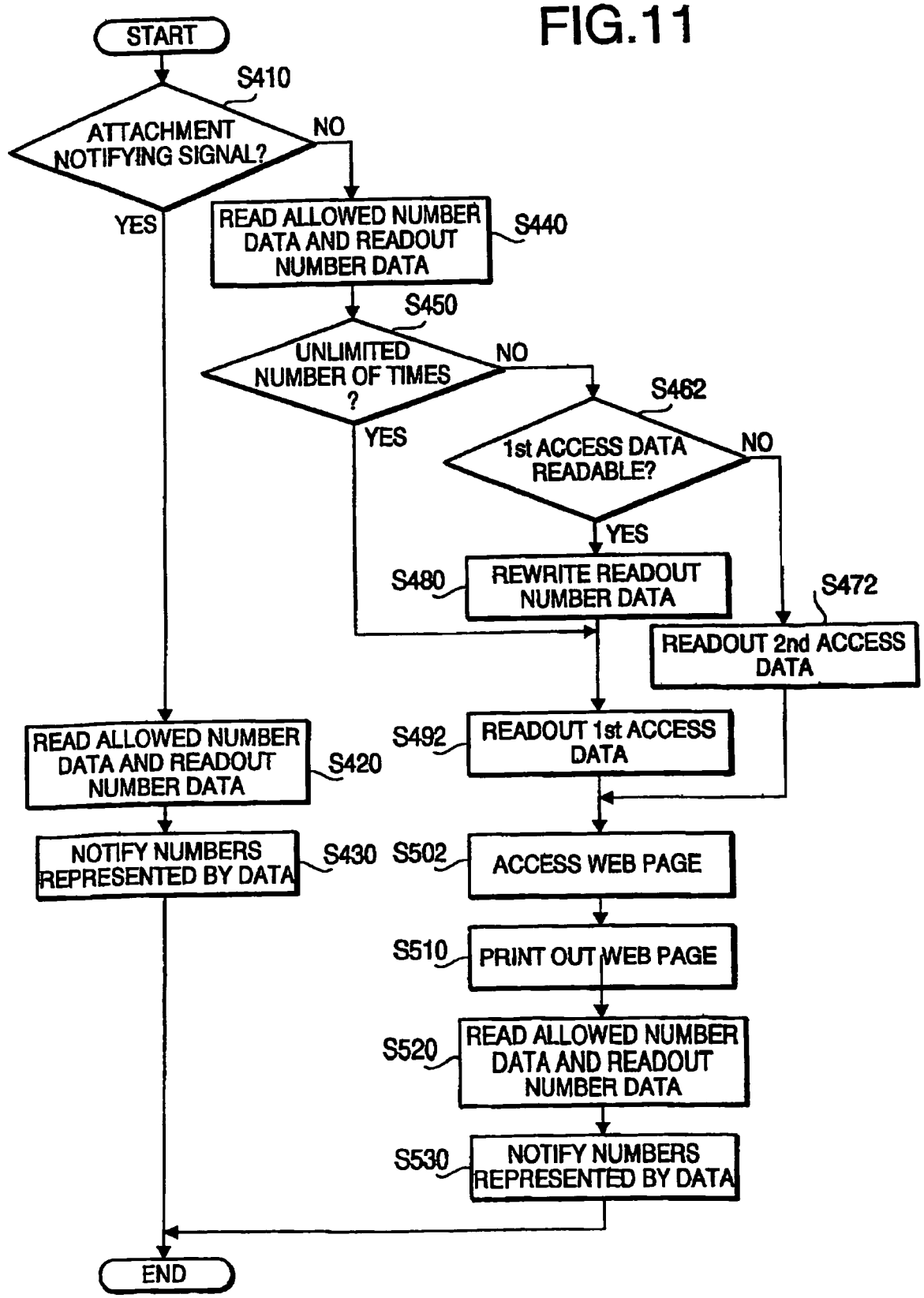
FIG. 11 is a flowchart illustrating an access management procedure according to a fifth embodiment of the invention.

Next, the access management procedure according to the fifth embodiment will be described. FIG. 11 is a flowchart illustrating the access management procedure according to the fourth embodiment. FIG. 11 is similar to FIG. 10 except that steps following S450 of FIG. 10 are changed to other steps in FIG. 11.

In FIG. 11, when the CPU 12 determines that the number of times by which the user is allowed to access the web page is limited (S450: NO), the CPU 12 determines whether the first access data can be read from the switch device 90 in S462.

In this step (S462), the CPU 12 determines that the access data can be read when a difference between the value p represented by the allowed number data and the value r represented by the readout number data is positive (i.e., p−r>0), otherwise (i.e., p−r≦0), the CPU 12 determines that the access data cannot be read. It should be noted that, when the difference is positive (i.e., p−r>0), the number of times by which the user has accessed the web page has not reached the maximum number of times by which the user is allowed to access the web page.

When the CPU 12 determines that the access data cannot be read (S462: NO), the CPU 12 reads out the second access data from the ROM 92 of the switch device 90. As in the third embodiment, the web page indicated by the second access data may be one indicating that the remaining number of times becomes zero, one inducing the user to obtain (buy) a new switch device 90 or one instructing the user to increase the remaining number of times.

When the CPU 12 determines that the access data can be read (S462: YES), the CPU 12 rewrites the readout number data stored in the RAM 93 (S480). That is, the CPU 12 increments the value r of the readout number data by one in S480.

When step S480 is finished, the CPU 12 reads out the first access data from the ROM 92 of the switch device 90 (S492) Then, in S502, the CPU 12 accesses the web page indicated by the access data read out in S472 or S492.

According to the MFP 5, the switch device 90 need not be provided with a CPU, and only by the procedure executed by the CPU 12, the function as in the third embodiment can be realized.

The MFPs 1-5 according to exemplary embodiments are described with reference to the drawings. The present invention is not limited to the configurations described above, and various modification can be made without departing from the scope of the invention.

For example, in the embodiments, the communication system according to the invention is applied to MFPs. It should be noted that the communication system according to the invention can be applied to any other device having a function of accessing a web page. Therefore, the invention is applicable, for example, to a personal computer, PDA (Personal Digital Assistant) and a facsimile machine capable of accessing and printing a web page.

Further, in each of the above-described embodiments, the communication system according to the invention consists of a single MFP. However, the invention need not be limited to such a configuration, and the communication system may include an MFP and a plurality of terminal devices other than the MFP, or consist of a plurality of terminal device other than the MFP.

In each of the above-identified embodiments, the switch device 90 is attached to the SW I/F 60 of the MFP. The invention is not limited to this configuration, and the switch device 90 may be designed to be attached to another interface (e.g., a memory card slot). In such a case, the switch device may have a fixed portion to be fixed to the interface, and a movable portion which is operated to move by the user.

In the above-described embodiments, some of the procedures are executed by the CPU of the MFP. This may be modified such that the procedure is performed by a computer system which is connected to the MFP with/without wire. Further, in some embodiments, the procedures are executed by the CPU of the switch device. This can also be modified such that the procedures are executed by the computer system connected to the switch device or MFP with/without wire.

In the above-described embodiments, the interface unit 64 of the SW I/F 60 includes the fixing unit 64*a* and the switch mechanism 64*b*. This may be modified such that the interface unit 64 only has the fixing unit 64*a*; and the switch device 90 is provided with the switch mechanism.

In the above-described embodiments, procedures shown in FIGS. 6, 8, 10 and 11 are executed by the CPU of the MFP in accordance with the programs stored in the ROM 14. The invention need not be limited to such a configuration, and, if the MFP is configured to read/write data with from/to a data recording medium such as FD, memory card or CD-ROM, the procedures stored in such a recording medium may be executed by the CPU of the MFP.

In the embodiments, the MFP is connected to a WAN (Wide Area Network) including the Internet 200. This configuration can be modified such that the MFP is connected to a LAN (Local Area Network).

In each embodiment, when the switch device 90 is attached to the SW I/F 60, the switch device 90 is to be depressed to access the web page. The invention need not be limited to such a structure. Any other method of operating the switch device 90 can be employed alternatively or optionally.

In each of the above-described embodiments, the SW I/F 60 is provided with the switch mechanism 64*b* for enabling the depression of the switch device 90. Alternatively, the mechanism for enabling the depression of the switch device 90 may be provided to the switch device 90 itself. In such a case, if it is configured that data transmission paths between the switch device 90 and the SW I/F 60 are established only when the switch device 90 is attached to the SW I/F 60, even when the switch device 90 is operated without being attached to the SW I/F 60, output of data from the switch device 90 is avoidable.

Alternatively, it is configured that a mechanism for enabling the depression of the switch device 90 is formed by portions of the switch device 90 and the SW I/F 60 where the switch device 90 is coupled to the SW I/F 60. In this case, even if the data transmission path between the switch device 90 and the MFP is formed when the switch device 90 is not attached to the SW I/F 60, since the switch device 90 cannot be operated (depressed), the data will not be output from the switch device 90.

In each embodiment described above, the switch device 90 stores one piece of data (access data, or first access data) representing a single intended web page, and the data is output in response to a single operation (i.e., depression) of the switch device 90. This may be modified such that the switch device 90 stores a plurality of pieces of access data representing a plurality of intended web pages, and different pieces of access data are output in response to different ways of operation of the switch device 90.

In each embodiment described above, an image of web page as accessed is printed out on the recording sheet. However, if the MFP has a displaying device having a sufficient area for displaying the web page, the image of the web page may be displayed on the display device, alternatively or optionally.

In the above-described embodiments, the access data represents a URL of the web page to be accessed. The invention need not be limited to such a configuration, and the access data may be data other than the URL if the data is a URI (Uniform Resource Identifier) for identifying hardware/software resources, for example, on the Internet 200.

In the above-described embodiments, when the remaining number of times by which the user is allowed to access the web page is not zero, the access data (first access data) is output. Alternatively or optionally based on the date, time or term represented by dates and times, access of the web page may be allowed. In such a modification, the access management procedure may be modified as shown in FIG. 12, which is a part of FIG. 8.

In this modification, the CPU 12 of the MFP 1 outputs the access data request signal (S250). Then, the CPU 91 determines whether the access data is to be output (cf. S120 of FIG. 5) based on the date/time/term as described above. The CPU 12 of the MFP 1, after outputting the access data request signal in S250, waits for reception of the access data from the switch device 90, and executes steps S260-S300.

Instead of referring to the remaining number of times or date/time/term as described above, the communication system may be configured such that the access data (or the first access data) is output when the user who has depressed the switch device 90 is authenticated. Specifically, the switch device 90 may be provided with an authentication input device through which the user inputs the authentication data, and the authentication data input by the user is stored in the RAM 93 of the switch device 90. When such a switch device is used, the user may input the authentication data every time the user operates the switch device 90. When such a switch device 90 is used, S120 of FIG. 5, for example, is modified such that the CPU 91 of the switch device compares the authentication data input by the user with the one stored in the RAM 93, and control proceeds to S130 only when the input authentication data coincides with the one stored in the RAM 93.

With the configuration described above, only when the user who operates the switch device is authenticated, the access data is transmitted from the switch device 90 to the MFP, and the MFP can access the web page. Thus, only a predetermined user is allowed to access the web page by operating the switch device 90.

When password or ID (Identification) data is used as the authentication data, the authentication input device is configured to have input keys. In this case, the user may be required to input the authentication data when the user depress the switch device 90.

When biometrics authentication using physical characteristics of human body (e.g., fingerprint, palm pattern, palm shape, veins on the back of the hand, iris, face, voice) is employed as the authentication data, the authentication data input device is configured to have sensors corresponding to the physical characteristics to be input. In this case, the user may be required to input the physical characteristics through the sensor when the switch device 90 is depressed.

In the above-described embodiments, the output of the count inquiry signal, reception of the response signal and notification of the remaining number of times are automatically executed (e.g., S220-S240 of FIG. 6 or 8, S310-S330 of FIG. 6 or 8). This may be modified such that these processes are performed in response to a predetermined operation by the user through the operation panel 42 of the user I/F 40.

According to such a modification, the user can check the number of times by which the user has accessed the web page, the remaining number of times, and the maximum number of times the user is allowed to access the web page at a desired timing.

In the above-described embodiments, the readout of the allowed number data and readout number data, and notification thereof (e.g., S420-S430 of FIG. 10 or 11, S520-S530 of FIG. 10 or 11) are automatically performed. This may be modified such that these processes are performed in response to a predetermined operation by the user through the operation panel 42 of the user I/F 40. According to such a modification, the user can check the number of times by which the user has accessed the web page, the remaining number of times at a desired timing.

In the above-described embodiments, the depression of the switch device 90 when attached to the SW I/F 60 is electronically detected using the second closed circuit. This may be modified such that displacement of the switch device 90 is detected using a sensor.

In some embodiments, the CPU 91 of the switch device 90 detects that the switch device is depressed with being attached to the SW I/F 60 based on the access data request signal which is transmitted from the FMP to the switch device 90 in response to the depression of the switch device 90. This may be modified such that the depression of the switch device 90 is detected by the displacement thereof using a sensor.

In the above-described embodiments, the notification is made by displaying a message on the display panel 44 of the user I/F 40 (e.g., S240, S280 and S330 of FIG. 6 or 8, S430 and S530 of FIG. 10 or 11, S470 of FIG. 10). However, the invention need not be limited to such a configuration. The notification may be made by printing a message or image indicative of the message using the printer unit 36. Alternatively, the message or warning tone may be output from the speaker unit 46.

In the third embodiment, the second access data is output in S170 of FIG. 9. It may be modified such that data other than the access data is output in S170, and in S280 of FIG. 8, the CPU 12 notifies that the access data has not been received, and executes operation based on the data received in S170.

In the fifth embodiment, different storage areas are assigned to the first and second access data, respectively. In S472 of FIG. 11, the data stored in the storage area assigned to the second access data is read out as the second access data. Similarly, in S492 of FIG. 11, the data stored in the storage area assigned to the first access data is read out as the first access data. With this configuration, the first and second access data can be distinguished. However, the invention need not be limited to such a configuration. For example, predetermined names are used for the first and second access data (e.g., filenames thereof) stored in the ROM 92 of the switch device 90, and the first and second data are distinguished by name.

In the embodiments above, the indication area A of the switch device 90 is formed with name or information related to the web page. It should be noted that the name/information may be formed by engraving, printing or writing, or applying a seal on which the name is printed or written. As the name/information related to the web page, not only the name of the web page but also any other information related to the web page may be used.

The present disclosure relates to the subject matter contained in Japanese Patent Application No. 2003-028361, filed on Feb. 5, 2003, which is expressly incorporated herein by reference in its entirety.

What is claimed is:

1. A communication system, comprising:
a communication device including:
an accessing unit capable of accessing web pages;
an interface unit having an opening, a first circuit and a second circuit; and
a data acquiring unit that acquires data via the interface unit;
a portable operation member removably insertable into the opening of the interface unit, the portable operation member including a memory that stores first access data corresponding to a first predetermined web page, wherein the first circuit is configured to activate in response to insertion of the portable operation member, which includes the memory, to a first depth into the opening of the interface unit, and the second circuit is configured to activate in response to a mechanical operation that further inserts the same portable operation member, which includes the memory, to a second depth in the opening of the interface unit, the second depth being greater than the first depth; and
an operation detecting unit configured to detect that the portable operation member is inserted into the opening of the interface unit when the first circuit activates and that the portable operation member is mechanically operated by a user when the second circuit activates;
the data acquiring unit automatically acquiring the first access data from the memory when the operation detecting unit detects that the second circuit activates and the accessing unit automatically accessing the first predetermined web page based on the first access data acquired by the acquiring unit.

2. The communication system according to claim 1, further comprising:
a transmitting system that transmits the first access data contained in the memory to the accessing unit when the operation detecting unit detects that the portable operation unit is mechanically operated by the user; and
wherein:
the transmitting system is included in the portable operation member;
the transmitting system determines whether a predetermined condition is satisfied when the operation detecting unit detects that the portable operation member is mechanically operated by the user; and
the transmitting system transmits the first access data from the memory to the accessing unit when the predetermined condition is satisfied.

3. The communication system according to claim 2, wherein:
the portable operation member includes:
a counting system that counts the number of times the first access data is transmitted from the memory to the accessing unit; and
wherein the transmitting system determines that the predetermined condition is satisfied if the number of times counted by the counting system is less than a predetermined number, the transmitting system determining the predetermined condition is not satisfied if the number of times counted by the counting system has reached the predetermined number.

4. The communication system according to claim 3, wherein:
the communication device includes:
a count inquiry system that transmits a count inquiry signal inquiring the number counted by the counting system to the portable operation member; and a count notifying system that notifies the number counted by the counting system based on a count response signal which is transmitted by the portable operation member in response to the count inquiry signal transmitted thereto; and the portable operation member includes a count response system that outputs the count response signal to the communication device in response to the count inquiry signal transmitted from the communication device.

5. The communication system according to claim 4, Wherein the count inquiry system transmits the count inquiry signal when the first access data is transmitted from the memory of the portable operation member.

6. The communication system according to claim 4, wherein the count inquiry system outputs the count inquiry signal when the operation detecting unit detects the insertion of the portable operation member.

7. The communication system according to claim 3, wherein:
the communication device includes:
an allowed number inquiry system that transmits an allowed number inquiry signal inquiring an allowed number of times that the first access data stored in the memory is allowed to be transmitted from the memory of the portable operation member; and
an allowed number notifying system that notifies the allowed number based on a response signal which is transmitted by the portable operation member in response to the allowance number inquiry signal transmitted thereto, and
the portable operation member includes a response system that outputs the response signal to the communication device in response to the allowed number inquiry signal transmitted from the communication device.

8. The communication system according to claim 7, wherein the allowed number inquiry system transmits the allowed number inquiry signal when the first access data is transmitted from the memory of the portable operation member.

9. The communication system according to claim 7, wherein the allowed number inquiry system outputs the allowed number inquiry signal when the operation detecting unit detects the insertion of the portable operation member.

10. The communication system according to claim 2, wherein:
the memory contains second access data indicating a second web page; and
the transmitting system transmits the second access data stored in the memory to the accessing unit if the predetermined condition is not satisfied when the operation detecting unit detects the mechanical operation of the portable operation unit by the user.

11. The communication system according to claim 1, wherein the communication device includes:
a device side detecting system that detects if the operation detecting unit is operated; and
a notification system that notifies that the first access data is not received because the predetermined condition is not satisfied when the first access data is not transmitted from the memory of the portable operation member for a predetermined period.

12. The communication system according to claim 1, further comprising:
a transmitting system that transmits the first access data contained in the memory to the accessing unit when the operation detecting unit detects the mechanical operation of the portable operation unit by the user; and wherein:
the transmitting system is included in the communication device;
the transmitting system determines whether a predetermined condition is satisfied when the operation detecting unit detects the mechanical operation of the portable operation by the user; and
the transmitting system transmits the first access data contained in the memory to the accessing unit when the predetermined condition is satisfied.

13. The communication system according to claim 12, wherein:
the memory stores a transmission number representing a number of times that the first access data is transmitted by the transmitting system;
the communication device includes:
a device side detection system that detects if the operation detecting unit detects the mechanical operation of the portable operation unit by the user; and
a readout system that reads out the transmission number from the memory when the device side detection system detects that the operation detecting unit detects the mechanical operation of the portable operation unit by the user;
the transmitting system determines that the predetermined condition is satisfied if the readout transmission number has not reached a predetermined number, the transmitting system determining that the predetermined condition is not satisfied when the readout transmission number has reached the predetermined number; and
the communication device further includes a rewriting system that increases the transmission number by one when the first access data is transmitted to the accessing unit.

14. The communication system according to claim 13, wherein the communication device includes a notification system that notifies the transmission number.

15. The communication system according to claim 13, wherein:
the memory contains an allowed number of times by which the first access data is allowed to be transmitted;
the readout system reads out the transmission number and the allowed number from the memory when the device side detection system detects if the operation detecting unit detects the mechanical operation of the portable operation unit by the user; and
the transmitting system determines that the predetermined condition is satisfied if the readout transmission number has not reached the allowed number, the transmitting system determining that the predetermined condition is not satisfied when the readout transmission number has reached the allowed number.

16. The communication system according to claim 13, wherein the memory comprises a ROM and a RAM, the ROM storing the first access data and the RAM storing the transmission number.

17. The communication system according to claim 12, wherein:
the memory contains second access data indicating a second web page; and
the transmitting system transmits the second access data stored in the memory to the accessing unit if the predetermined condition is not satisfied when the portable operation member is mechanically operated.

18. The communication system according to claim 1, wherein the memory comprises a ROM, the ROM storing the first access data.

19. The communication system according to claim 1, wherein the mechanical operation of the portable operation member includes a depression of the portable operation member by the user.

20. The communication system according to claim 1, wherein the operation detecting unit is part of the portable operation member.

21. A communication system, comprising:
a communication device including:
an accessing unit capable of accessing web pages;
a plurality of interface units, each interface unit having an opening, a first circuit, and a second circuit;
a plurality of data acquiring units that acquire data via the interface units;
a plurality of portable operation members, each portable operation member removably insertable into the openings of the interface units, each of the plurality of portable operation members including a memory that stores access data corresponding to a predetermined web page, wherein the first circuit is configured to activate in response to insertion of one of the portable operation members, which includes the memory, to a first depth into the opening of one of the interface units, and the second circuit is configured to activate in response to a mechanical operation that further inserts the same one of the portable operation members, which includes the memory, to a second depth in the opening of the one of the interface units, the second depth being greater than the first depth;
at least one operation detection unit configured to detect that one of the portable operation members is inserted into an opening of an interface unit when the first circuit activates and that the one of the plurality of portable operation members is mechanically operated by a user when the second circuit activates;
the data acquiring units automatically acquiring the access data from the memory when the operation detecting unit detects that the second circuit activates and the accessing unit automatically accessing the predetermined web page based on the access data acquired by the acquiring unit.

22. The communication system according to claim 21, wherein the mechanical operation of the portable operation member includes a depression of one of the plurality of portable operation members by the user.

23. The communication system according to claim 21, wherein the at least one operation detection unit comprises a plurality of operation detecting units each being part of a respective one of the plurality of portable operation members.

24. A non-transitory computer-readable storage medium storing a computer-executable program for allowing a communication system to access a predetermined web page, the program comprising:
instructions for controlling a detecting unit to detect (1) an insertion of a portable operation member, which includes a memory that stores access data corresponding to the predetermined web page, to a first depth into an opening of an interface unit of the communication system, the insertion activating a first circuit of the interface unit, and (2) a mechanical operation that further inserts the same portable operation member, which includes the memory, to a second depth into the opening of the interface unit, the mechanical operation activating a second circuit of the interface unit, the second depth being greater than the first depth;
instructions for transmitting the access data contained in the memory of the portable operation member to an accessing unit of the communication system upon the detection of the mechanical operation of the portable operation member; and
instructions for causing the accessing unit to access the predetermined web page based on the access data transmitted from the memory of the portable operation member.

25. The non-transitory computer-readable storage medium according to claim 24, wherein the instructions for controlling the detecting unit to detect a mechanical operation of the portable operation member include instructions for detecting a depression of the portable operation member.

26. The non-transitory computer-readable storage medium according to claim 24, wherein the detecting unit is part of the portable operation member.

* * * * *